US009152727B1

(12) United States Patent
Balducci et al.

(10) Patent No.: US 9,152,727 B1
(45) Date of Patent: Oct. 6, 2015

(54) SYSTEMS AND METHODS FOR PROCESSING CONSUMER INFORMATION FOR TARGETED MARKETING APPLICATIONS

(75) Inventors: Michael Balducci, Aliso Viejo, CA (US); Thomas C. Manvydas, Cerritos, CA (US); Nadya Kohl, Glen Ridge, NJ (US); Paul Koelfgen, Aurora, CO (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 850 days.

(21) Appl. No.: 13/215,161

(22) Filed: Aug. 22, 2011

Related U.S. Application Data

(60) Provisional application No. 61/376,157, filed on Aug. 23, 2010.

(51) Int. Cl.
*G06F 17/30* (2006.01)
*G06Q 30/02* (2012.01)

(52) U.S. Cl.
CPC .......... *G06F 17/30876* (2013.01); *G06Q 30/02* (2013.01)

(58) Field of Classification Search
CPC ... G06F 17/30876; G06Q 30/02; H04L 63/10
See application file for complete search history.

(56) References Cited

U.S. PATENT DOCUMENTS

| 4,775,935 A | 10/1988 | Yourick |
|---|---|---|
| 4,827,508 A | 5/1989 | Shear |
| 4,868,570 A | 9/1989 | Davis |
| 4,872,113 A | 10/1989 | Dinerstein |
| 4,935,870 A | 6/1990 | Burk, Jr. et al. |
| 4,982,346 A | 1/1991 | Girouard et al. |
| 5,056,019 A | 10/1991 | Schultz et al. |
| 5,201,010 A | 4/1993 | Deaton et al. |

(Continued)

FOREIGN PATENT DOCUMENTS

| CN | 1290372 | 5/2001 |
|---|---|---|
| DE | 91 08 341 | 10/1991 |

(Continued)

OTHER PUBLICATIONS

U.S. Appl. No. 12/705,489, filed Feb. 12, 2010, Bargoli et al.

(Continued)

*Primary Examiner* — Mohammad S Rostami
(74) *Attorney, Agent, or Firm* — Knobbe Martens Olson & Bear LLP

(57) ABSTRACT

Embodiments of the invention include systems and methods that enable the association and aggregation of consumer data gathered from online and offline sources. In particular, several embodiments are directed to linking consumer data in a data source controlled by an entity (e.g., such as a company's CRM (customer relationship management) database) to offline data sources such as demographic data, and/or online data sources such as online interaction data. The linking may be based on several identifiers (IDs) associated with the data sources. The systems and methods disclosed herein thus facilitate the association of these disparate data sources and enable various entities to better tailor interactions with the consumers. In other embodiments, a shared cookie data management system and method is disclosed. The shared cookie serves as a vehicle through which entities can selectively share consumer information with other entities in a system with uniform format and technical infrastructure.

13 Claims, 11 Drawing Sheets

(56) References Cited

U.S. PATENT DOCUMENTS

| | | |
|---|---|---|
| 5,247,575 A | 9/1993 | Sprague et al. |
| 5,274,547 A | 12/1993 | Zoffel et al. |
| 5,283,731 A | 2/1994 | Lalonde et al. |
| 5,305,195 A | 4/1994 | Murphy |
| 5,325,509 A | 6/1994 | Lautzenheiser |
| 5,341,429 A | 8/1994 | Stringer et al. |
| 5,454,030 A | 9/1995 | de Oliveira et al. |
| 5,459,306 A | 10/1995 | Stein et al. |
| 5,504,675 A | 4/1996 | Cragun et al. |
| 5,506,897 A | 4/1996 | Moore et al. |
| 5,515,098 A | 5/1996 | Carles |
| 5,528,701 A | 6/1996 | Aref |
| 5,555,409 A | 9/1996 | Leenstra, Sr. et al. |
| 5,563,783 A | 10/1996 | Stolfo et al. |
| 5,590,038 A | 12/1996 | Pitroda |
| 5,592,560 A | 1/1997 | Deaton et al. |
| 5,627,973 A | 5/1997 | Armstrong et al. |
| 5,629,982 A | 5/1997 | Micali |
| 5,630,127 A | 5/1997 | Moore et al. |
| 5,640,551 A | 6/1997 | Chu et al. |
| 5,640,577 A | 6/1997 | Scharmer |
| 5,649,114 A | 7/1997 | Deaton et al. |
| 5,655,129 A | 8/1997 | Ito |
| 5,659,731 A | 8/1997 | Gustafson |
| 5,661,516 A | 8/1997 | Carles |
| 5,666,528 A | 9/1997 | Thai |
| 5,692,107 A | 11/1997 | Simoudis et al. |
| 5,696,907 A | 12/1997 | Tom |
| 5,724,521 A | 3/1998 | Dedrick |
| 5,737,732 A | 4/1998 | Gibson et al. |
| 5,740,549 A | 4/1998 | Reilly et al. |
| 5,745,654 A | 4/1998 | Titan |
| 5,745,694 A | 4/1998 | Egawa et al. |
| 5,748,098 A | 5/1998 | Grace |
| 5,754,938 A | 5/1998 | Herz et al. |
| 5,768,423 A | 6/1998 | Aref et al. |
| 5,774,692 A | 6/1998 | Boyer et al. |
| 5,774,868 A | 6/1998 | Cragun et al. |
| 5,774,870 A | 6/1998 | Storey |
| 5,778,405 A | 7/1998 | Ogawa |
| 5,797,136 A | 8/1998 | Boyer et al. |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,832,068 A | 11/1998 | Smith |
| 5,835,915 A | 11/1998 | Carr et al. |
| 5,844,218 A | 12/1998 | Kawan et al. |
| 5,848,131 A | 12/1998 | Shaffer et al. |
| 5,848,396 A | 12/1998 | Gerace |
| 5,857,175 A | 1/1999 | Day et al. |
| 5,864,822 A | 1/1999 | Baker, III |
| 5,870,721 A | 2/1999 | Norris |
| 5,873,068 A | 2/1999 | Beaumont et al. |
| 5,881,131 A | 3/1999 | Farris et al. |
| 5,884,287 A | 3/1999 | Edesess |
| 5,901,214 A | 5/1999 | Shaffer et al. |
| 5,905,985 A | 5/1999 | Malloy et al. |
| 5,907,608 A | 5/1999 | Shaffer et al. |
| 5,910,982 A | 6/1999 | Shaffer et al. |
| 5,912,839 A | 6/1999 | Ovshinsky et al. |
| 5,915,243 A | 6/1999 | Smolen |
| 5,924,082 A | 7/1999 | Silverman et al. |
| 5,926,800 A | 7/1999 | Baronowski et al. |
| 5,930,764 A | 7/1999 | Melchione et al. |
| 5,930,776 A | 7/1999 | Dykstra et al. |
| 5,933,813 A | 8/1999 | Teicher et al. |
| 5,944,790 A | 8/1999 | Levy |
| 5,953,707 A | 9/1999 | Huang et al. |
| 5,956,397 A | 9/1999 | Shaffer et al. |
| 5,956,693 A | 9/1999 | Geerlings |
| 5,963,932 A | 10/1999 | Jakobsson et al. |
| 5,966,695 A | 10/1999 | Melchione et al. |
| 5,974,396 A | 10/1999 | Anderson et al. |
| 5,982,868 A | 11/1999 | Shaffer et al. |
| 5,991,735 A | 11/1999 | Gerace |
| 6,009,415 A | 12/1999 | Shurling et al. |
| 6,014,688 A | 1/2000 | Venkatraman et al. |
| 6,018,723 A | 1/2000 | Siegel et al. |
| 6,026,368 A | 2/2000 | Brown et al. |
| 6,029,139 A | 2/2000 | Cunningham et al. |
| 6,038,551 A | 3/2000 | Barlow et al. |
| 6,044,357 A | 3/2000 | Garg |
| 6,058,179 A | 5/2000 | Shaffer et al. |
| 6,061,658 A | 5/2000 | Chou et al. |
| 6,061,691 A | 5/2000 | Fox |
| 6,064,973 A | 5/2000 | Smith et al. |
| 6,064,990 A | 5/2000 | Goldsmith |
| 6,070,142 A | 5/2000 | McDonough et al. |
| 6,070,147 A | 5/2000 | Harms et al. |
| 6,073,140 A | 6/2000 | Morgan et al. |
| 6,073,241 A | 6/2000 | Rosenberg et al. |
| 6,085,169 A | 7/2000 | Walker et al. |
| 6,091,810 A | 7/2000 | Shaffer et al. |
| 6,101,486 A | 8/2000 | Roberts et al. |
| 6,115,693 A | 9/2000 | McDonough et al. |
| 6,121,901 A | 9/2000 | Welch et al. |
| 6,128,602 A | 10/2000 | Northington et al. |
| 6,128,624 A | 10/2000 | Papierniak et al. |
| 6,144,948 A | 11/2000 | Walker et al. |
| 6,144,957 A | 11/2000 | Cohen et al. |
| 6,151,601 A | 11/2000 | Papierniak et al. |
| 6,157,927 A | 12/2000 | Schaefer et al. |
| 6,178,442 B1 | 1/2001 | Yamazaki |
| 6,182,060 B1 | 1/2001 | Hedgcock et al. |
| 6,185,290 B1 | 2/2001 | Shaffer et al. |
| 6,202,053 B1 | 3/2001 | Christiansen et al. |
| 6,208,979 B1 | 3/2001 | Sinclair |
| 6,209,033 B1 | 3/2001 | Datta et al. |
| 6,223,171 B1 | 4/2001 | Chaudhuri et al. |
| 6,233,566 B1 | 5/2001 | Levine et al. |
| 6,236,977 B1 | 5/2001 | Verba et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,289,318 B1 | 9/2001 | Barber |
| 6,298,330 B1 | 10/2001 | Gardenswartz et al. |
| 6,304,869 B1 | 10/2001 | Moore et al. |
| 6,308,210 B1 | 10/2001 | Fields et al. |
| 6,317,752 B1 | 11/2001 | Lee et al. |
| 6,324,566 B1 | 11/2001 | Himmel et al. |
| 6,330,546 B1 | 12/2001 | Gopinathan et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,381,324 B1 | 4/2002 | Shaffer et al. |
| 6,385,312 B1 | 5/2002 | Shaffer et al. |
| 6,385,592 B1 | 5/2002 | Angles et al. |
| 6,385,594 B1 | 5/2002 | Lebda et al. |
| 6,405,173 B1 | 6/2002 | Honarvar |
| 6,412,012 B1 | 6/2002 | Bieganski et al. |
| 6,424,956 B1 | 7/2002 | Werbos |
| 6,442,577 B1 | 8/2002 | Britton et al. |
| 6,446,200 B1 | 9/2002 | Ball et al. |
| 6,456,979 B1 | 9/2002 | Flagg |
| 6,457,012 B1 | 9/2002 | Jatkowski |
| 6,460,036 B1 | 10/2002 | Herz |
| 6,496,819 B1 | 12/2002 | Bello et al. |
| 6,505,168 B1 | 1/2003 | Rothman et al. |
| 6,513,018 B1 | 1/2003 | Culhane |
| 6,523,022 B1 | 2/2003 | Hobbs |
| 6,523,041 B1 | 2/2003 | Morgan et al. |
| 6,549,944 B1 | 4/2003 | Weinberg et al. |
| 6,570,975 B2 | 5/2003 | Shaffer et al. |
| 6,574,623 B1 | 6/2003 | Laung et al. |
| 6,598,030 B1 | 7/2003 | Siegel et al. |
| 6,606,744 B1 | 8/2003 | Mikurak |
| 6,608,892 B2 | 8/2003 | Shaffer et al. |
| 6,611,816 B2 | 8/2003 | Lebda et al. |
| 6,615,247 B1 | 9/2003 | Murphy |
| 6,623,529 B1 | 9/2003 | Lakritz |
| 6,631,496 B1 | 10/2003 | Li et al. |

(56) References Cited

U.S. PATENT DOCUMENTS

| | | |
|---|---|---|
| 6,640,215 B1 | 10/2003 | Galperin et al. |
| 6,651,220 B1 | 11/2003 | Penteroudakis et al. |
| 6,658,393 B1 | 12/2003 | Basch et al. |
| 6,661,884 B2 | 12/2003 | Shaffer et al. |
| 6,665,715 B1 | 12/2003 | Houri |
| 6,671,818 B1 | 12/2003 | Mikurak |
| 6,698,020 B1 | 2/2004 | Zigmond et al. |
| 6,748,426 B1 | 6/2004 | Shaffer et al. |
| 6,757,740 B1 | 6/2004 | Parekh et al. |
| 6,766,327 B2 | 7/2004 | Morgan, Jr. et al. |
| 6,801,909 B2 | 10/2004 | Delgado et al. |
| 6,804,346 B1 | 10/2004 | Mewhinney |
| 6,804,701 B2 | 10/2004 | Muret et al. |
| 6,810,356 B1 | 10/2004 | Garcia-Franco et al. |
| 6,873,979 B2 | 3/2005 | Fishman et al. |
| 6,901,406 B2 | 5/2005 | Nabe et al. |
| 6,910,624 B1 | 6/2005 | Natsuno |
| 6,915,269 B1 | 7/2005 | Shapiro et al. |
| 6,925,441 B1 | 8/2005 | Jones, III et al. |
| 6,934,714 B2 | 8/2005 | Meinig |
| 6,954,757 B2 | 10/2005 | Zargham et al. |
| 6,959,281 B1 | 10/2005 | Freeling et al. |
| 6,970,830 B1 | 11/2005 | Samra et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,993,493 B1 | 1/2006 | Galperin et al. |
| 6,993,596 B2 | 1/2006 | Hinton et al. |
| 7,003,504 B1 | 2/2006 | Angus et al. |
| 7,003,792 B1 | 2/2006 | Yuen |
| 7,028,001 B1 | 4/2006 | Muthuswamy et al. |
| 7,028,052 B2 | 4/2006 | Chapman et al. |
| 7,031,945 B1 | 4/2006 | Donner |
| 7,033,792 B2 | 4/2006 | Zhong et al. |
| 7,035,855 B1 | 4/2006 | Kilger et al. |
| 7,039,607 B2 | 5/2006 | Watarai et al. |
| 7,047,251 B2 | 5/2006 | Reed et al. |
| 7,050,989 B1 | 5/2006 | Hurt et al. |
| 7,054,828 B2 | 5/2006 | Heching et al. |
| 7,072,853 B2 | 7/2006 | Shkedi |
| 7,072,963 B2 | 7/2006 | Anderson et al. |
| 7,076,475 B2 | 7/2006 | Honarvar |
| 7,082,435 B1 | 7/2006 | Guzman et al. |
| 7,085,734 B2 | 8/2006 | Grant et al. |
| 7,133,935 B2 | 11/2006 | Hedy |
| 7,136,448 B1 | 11/2006 | Venkataperumal et al. |
| 7,136,474 B2 | 11/2006 | Shaffer et al. |
| 7,143,195 B2 | 11/2006 | Vange et al. |
| 7,150,030 B1 | 12/2006 | Eldering et al. |
| 7,152,018 B2 | 12/2006 | Wicks |
| 7,152,237 B2 | 12/2006 | Flickinger et al. |
| 7,167,553 B2 | 1/2007 | Shaffer et al. |
| 7,167,907 B2 | 1/2007 | Shaffer et al. |
| 7,184,974 B2 | 2/2007 | Shishido |
| 7,185,016 B1 | 2/2007 | Rasmussen |
| 7,185,353 B2 | 2/2007 | Schlack |
| 7,191,144 B2 | 3/2007 | White |
| 7,200,602 B2 | 4/2007 | Jonas |
| 7,203,300 B2 | 4/2007 | Shaffer et al. |
| 7,240,059 B2 | 7/2007 | Bayliss et al. |
| 7,243,075 B1 | 7/2007 | Shaffer et al. |
| 7,249,048 B1 | 7/2007 | O'Flaherty |
| 7,272,591 B1 | 9/2007 | Ghazal et al. |
| 7,275,083 B1 | 9/2007 | Seibel et al. |
| 7,277,900 B1 | 10/2007 | Ganesh et al. |
| 7,296,734 B2 | 11/2007 | Pliha |
| 7,302,402 B2 | 11/2007 | Callaghan et al. |
| 7,305,364 B2 | 12/2007 | Nabe et al. |
| 7,308,418 B2 | 12/2007 | Malek et al. |
| 7,310,617 B1 | 12/2007 | Cunningham |
| 7,313,538 B2 | 12/2007 | Wilmes et al. |
| 7,328,169 B2 | 2/2008 | Temares et al. |
| 7,328,435 B2 | 2/2008 | Trifon |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,370,351 B1 | 5/2008 | Ramachandran et al. |
| 7,376,603 B1 | 5/2008 | Mayr et al. |
| 7,383,227 B2 | 6/2008 | Weinflash et al. |
| 7,403,942 B1 | 7/2008 | Bayliss |
| 7,421,322 B1 | 9/2008 | Silversmith et al. |
| 7,424,439 B1 | 9/2008 | Fayyad et al. |
| 7,428,526 B2 | 9/2008 | Miller et al. |
| 7,433,864 B2 | 10/2008 | Malik |
| 7,451,095 B1 | 11/2008 | Bradley et al. |
| 7,451,113 B1 | 11/2008 | Kasower |
| 7,458,508 B1 | 12/2008 | Shao et al. |
| 7,467,127 B1 | 12/2008 | Baccash et al. |
| 7,472,088 B2 | 12/2008 | Taylor et al. |
| 7,499,868 B2 | 3/2009 | Galperin et al. |
| 7,523,191 B1 | 4/2009 | Thomas et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,546,266 B2 | 6/2009 | Beirne et al. |
| 7,546,619 B2 | 6/2009 | Anderson et al. |
| 7,556,192 B2 | 7/2009 | Wokaty, Jr. |
| 7,562,184 B2 | 7/2009 | Henmi et al. |
| 7,562,382 B2 | 7/2009 | Hinton et al. |
| 7,571,139 B1 | 8/2009 | Giordano et al. |
| 7,571,322 B2 | 8/2009 | Karoubi |
| 7,580,856 B1 | 8/2009 | Pliha |
| 7,590,589 B2 | 9/2009 | Hoffberg |
| 7,596,512 B1 | 9/2009 | Raines et al. |
| 7,596,716 B2 | 9/2009 | Frost et al. |
| 7,606,778 B2 | 10/2009 | Dewar |
| 7,610,257 B1 | 10/2009 | Abrahams |
| 7,653,592 B1 | 1/2010 | Flaxman et al. |
| 7,653,593 B2 | 1/2010 | Zarikian et al. |
| 7,668,840 B2 | 2/2010 | Bayliss et al. |
| 7,672,833 B2 | 3/2010 | Blume et al. |
| 7,672,865 B2 | 3/2010 | Kumar et al. |
| 7,672,924 B1 | 3/2010 | Scheurich et al. |
| 7,672,926 B2 | 3/2010 | Ghazal et al. |
| 7,686,214 B1 | 3/2010 | Shao et al. |
| 7,689,505 B2 | 3/2010 | Kasower |
| 7,698,163 B2 | 4/2010 | Reed et al. |
| 7,698,236 B2 | 4/2010 | Cox et al. |
| 7,707,059 B2 | 4/2010 | Reed et al. |
| 7,711,635 B2 | 5/2010 | Steele et al. |
| 7,711,636 B2 | 5/2010 | Robida et al. |
| 7,725,300 B2 | 5/2010 | Pinto et al. |
| 7,730,509 B2 | 6/2010 | Boulet et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,783,515 B1 | 8/2010 | Kumar et al. |
| 7,788,147 B2 | 8/2010 | Haggerty et al. |
| 7,793,835 B1 | 9/2010 | Coggeshall et al. |
| 7,797,252 B2 | 9/2010 | Rosskamm et al. |
| 7,801,812 B2 | 9/2010 | Conlin et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,849,004 B2 | 12/2010 | Choudhuri et al. |
| 7,860,786 B2 | 12/2010 | Blackburn et al. |
| 7,925,549 B2 | 4/2011 | Looney et al. |
| 7,930,242 B2 | 4/2011 | Morris et al. |
| 7,954,698 B1 | 6/2011 | Pliha |
| 7,962,404 B1 | 6/2011 | Metzger, II et al. |
| 7,962,501 B1 | 6/2011 | Semprevivo et al. |
| 7,974,860 B1 | 7/2011 | Travis |
| 7,983,932 B2 | 7/2011 | Kane |
| 7,991,666 B2 | 8/2011 | Haggerty et al. |
| 7,991,689 B1 | 8/2011 | Brunzell et al. |
| 7,991,901 B2 | 8/2011 | Tarquini et al. |
| 7,996,521 B2 | 8/2011 | Chamberlain et al. |
| 7,996,912 B2 | 8/2011 | Spalink et al. |
| 8,001,042 B1 | 8/2011 | Brunzell et al. |
| 8,005,712 B2 | 8/2011 | von Davier et al. |
| 8,005,759 B2 | 8/2011 | Hirtenstein et al. |
| 8,015,045 B2 | 9/2011 | Galperin et al. |

(56) References Cited

U.S. PATENT DOCUMENTS

| | | |
|---|---|---|
| 8,024,264 B2 | 9/2011 | Chaudhuri et al. |
| 8,027,871 B2 | 9/2011 | Willams et al. |
| 8,036,979 B1 | 10/2011 | Torrez et al. |
| 8,065,233 B2 | 11/2011 | Lee et al. |
| 8,078,453 B2 | 12/2011 | Shaw |
| 8,078,524 B2 | 12/2011 | Crawford et al. |
| 8,078,528 B1 | 12/2011 | Vicente et al. |
| 8,086,524 B1 | 12/2011 | Craig et al. |
| 8,095,443 B2 | 1/2012 | DeBie |
| 8,099,341 B2 | 1/2012 | Varghese |
| 8,099,356 B2 | 1/2012 | Feinstein et al. |
| 8,126,805 B2 | 2/2012 | Sulkowski et al. |
| 8,127,982 B1 | 3/2012 | Casey et al. |
| 8,127,986 B1 | 3/2012 | Taylor et al. |
| 8,135,607 B2 | 3/2012 | Williams et al. |
| 8,135,642 B1 | 3/2012 | Krause |
| 8,145,754 B2 | 3/2012 | Chamberlain et al. |
| 8,161,104 B2 | 4/2012 | Tomkow |
| 8,234,498 B2 | 7/2012 | Britti et al. |
| 8,271,313 B2 | 9/2012 | Williams et al. |
| 8,271,378 B2 | 9/2012 | Chaudhuri et al. |
| 8,280,805 B1 | 10/2012 | Abrahams et al. |
| 8,285,577 B1 | 10/2012 | Galperin et al. |
| 8,285,656 B1 | 10/2012 | Chang et al. |
| 8,290,840 B2 | 10/2012 | Kasower |
| 8,296,229 B1 | 10/2012 | Yellin et al. |
| 8,301,574 B2 | 10/2012 | Kilger et al. |
| 8,312,033 B1 | 11/2012 | McMillan |
| 8,315,943 B2 | 11/2012 | Torrez et al. |
| 8,321,952 B2 | 11/2012 | Spalink et al. |
| 8,364,518 B1 | 1/2013 | Blake et al. |
| 8,364,588 B2 | 1/2013 | Celka et al. |
| 8,386,377 B1 | 2/2013 | Xiong et al. |
| 8,392,334 B2 | 3/2013 | Hirtenstein et al. |
| 8,412,593 B1 | 4/2013 | Song et al. |
| 8,463,919 B2 | 6/2013 | Tarquini et al. |
| 8,468,198 B2 | 6/2013 | Tomkow |
| 8,478,674 B1 | 7/2013 | Kapczynski et al. |
| 8,515,828 B1 | 8/2013 | Wolf et al. |
| 8,515,862 B2 | 8/2013 | Zhang et al. |
| 8,533,322 B2 | 9/2013 | Chamberlain et al. |
| 8,560,434 B2 | 10/2013 | Morris et al. |
| 8,560,666 B2 | 10/2013 | Low |
| 8,566,167 B2 | 10/2013 | Munjal |
| 8,606,626 B1 | 12/2013 | DeSoto et al. |
| 8,606,666 B1 | 12/2013 | Courbage et al. |
| 8,626,560 B1 | 1/2014 | Anderson |
| 8,626,563 B2 | 1/2014 | Williams et al. |
| 8,626,646 B2 | 1/2014 | Torrez et al. |
| 8,639,616 B1 | 1/2014 | Rolenaitis et al. |
| 8,639,920 B2 | 1/2014 | Stack et al. |
| 8,732,004 B1 | 5/2014 | Ramos et al. |
| 8,738,515 B2 | 5/2014 | Chaudhuri et al. |
| 8,966,649 B2 | 2/2015 | Stack et al. |
| 2001/0011245 A1 | 8/2001 | Duhon |
| 2001/0014868 A1 | 8/2001 | Herz et al. |
| 2001/0037332 A1 | 11/2001 | Miller et al. |
| 2001/0037359 A1 | 11/2001 | Mockett et al. |
| 2001/0039523 A1 | 11/2001 | Iwamoto |
| 2001/0049620 A1 | 12/2001 | Blasko |
| 2002/0023051 A1 | 2/2002 | Kunzle et al. |
| 2002/0026507 A1 | 2/2002 | Sears et al. |
| 2002/0029162 A1 | 3/2002 | Mascarenhas |
| 2002/0046099 A1 | 4/2002 | Frengut et al. |
| 2002/0049968 A1 | 4/2002 | Wilson et al. |
| 2002/0055906 A1 | 5/2002 | Katz et al. |
| 2002/0069122 A1 | 6/2002 | Yun et al. |
| 2002/0069203 A1 | 6/2002 | Dar et al. |
| 2002/0077964 A1 | 6/2002 | Brody et al. |
| 2002/0082892 A1 | 6/2002 | Raffel et al. |
| 2002/0099628 A1 | 7/2002 | Yakaoka et al. |
| 2002/0099641 A1 | 7/2002 | Mills et al. |
| 2002/0099824 A1 | 7/2002 | Bender et al. |
| 2002/0099936 A1* | 7/2002 | Kou et al. .................. 713/151 |
| 2002/0103809 A1 | 8/2002 | Starzl et al. |
| 2002/0111910 A1 | 8/2002 | Walsh |
| 2002/0120504 A1 | 8/2002 | Gould et al. |
| 2002/0123904 A1 | 9/2002 | Amengual et al. |
| 2002/0123928 A1 | 9/2002 | Eldering et al. |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133404 A1 | 9/2002 | Pedersen |
| 2002/0133504 A1 | 9/2002 | Vlahos et al. |
| 2002/0138297 A1 | 9/2002 | Lee |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0147669 A1 | 10/2002 | Taylor et al. |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173984 A1 | 11/2002 | Robertson et al. |
| 2002/0184255 A1 | 12/2002 | Edd et al. |
| 2002/0188544 A1 | 12/2002 | Wizon et al. |
| 2002/0194103 A1 | 12/2002 | Nabe |
| 2002/0198824 A1 | 12/2002 | Cook |
| 2003/0009418 A1 | 1/2003 | Green et al. |
| 2003/0018549 A1 | 1/2003 | Fei et al. |
| 2003/0018578 A1 | 1/2003 | Schultz |
| 2003/0023489 A1 | 1/2003 | McGuire et al. |
| 2003/0033242 A1 | 2/2003 | Lynch et al. |
| 2003/0041050 A1 | 2/2003 | Smith et al. |
| 2003/0046222 A1 | 3/2003 | Bard et al. |
| 2003/0060284 A1 | 3/2003 | Hamalainen et al. |
| 2003/0065563 A1 | 4/2003 | Elliott et al. |
| 2003/0069839 A1 | 4/2003 | Whittington et al. |
| 2003/0097342 A1 | 5/2003 | Whittingtom |
| 2003/0097380 A1 | 5/2003 | Mulhern et al. |
| 2003/0101344 A1 | 5/2003 | Wheeler et al. |
| 2003/0105728 A1 | 6/2003 | Yano et al. |
| 2003/0158776 A1* | 8/2003 | Landesmann .................. 705/14 |
| 2003/0171942 A1 | 9/2003 | Gaito |
| 2003/0200135 A1 | 10/2003 | Wright |
| 2003/0212654 A1 | 11/2003 | Harper et al. |
| 2003/0216965 A1 | 11/2003 | Libman |
| 2003/0219709 A1 | 11/2003 | Olenick et al. |
| 2003/0229507 A1 | 12/2003 | Perge |
| 2003/0229892 A1 | 12/2003 | Sardera |
| 2003/0233278 A1 | 12/2003 | Marshall |
| 2003/0233323 A1 | 12/2003 | Bilski et al. |
| 2003/0233655 A1 | 12/2003 | Gutta et al. |
| 2004/0002878 A1 | 1/2004 | Hinton |
| 2004/0010458 A1 | 1/2004 | Friedman |
| 2004/0024848 A1 | 2/2004 | Smith |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0049729 A1 | 3/2004 | Penfield |
| 2004/0059626 A1 | 3/2004 | Smallwood |
| 2004/0062213 A1 | 4/2004 | Koss |
| 2004/0078809 A1 | 4/2004 | Drazin |
| 2004/0083215 A1* | 4/2004 | de Jong ........................... 707/7 |
| 2004/0098625 A1 | 5/2004 | Lagadec et al. |
| 2004/0102197 A1 | 5/2004 | Dietz |
| 2004/0107125 A1 | 6/2004 | Guheen et al. |
| 2004/0111359 A1 | 6/2004 | Hudock |
| 2004/0117358 A1 | 6/2004 | Von Kaenel et al. |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128193 A1 | 7/2004 | Brice et al. |
| 2004/0128230 A1 | 7/2004 | Oppenheimer et al. |
| 2004/0128236 A1 | 7/2004 | Brown et al. |
| 2004/0138932 A1 | 7/2004 | Johnson et al. |
| 2004/0139025 A1 | 7/2004 | Coleman |
| 2004/0153330 A1 | 8/2004 | Miller et al. |
| 2004/0153448 A1 | 8/2004 | Cheng et al. |
| 2004/0153509 A1 | 8/2004 | Alcorn et al. |
| 2004/0163101 A1 | 8/2004 | Swix |
| 2004/0176995 A1 | 9/2004 | Fusz |
| 2004/0199456 A1 | 10/2004 | Flint et al. |
| 2004/0199584 A1 | 10/2004 | Kirshenbaum et al. |

(56) References Cited

U.S. PATENT DOCUMENTS

| | | |
|---|---|---|
| 2004/0199789 A1 | 10/2004 | Shaw et al. |
| 2004/0205157 A1 | 10/2004 | Bibelnieks et al. |
| 2004/0220896 A1 | 11/2004 | Finlay et al. |
| 2004/0225594 A1 | 11/2004 | Nolan, III et al. |
| 2004/0225596 A1 | 11/2004 | Kemper et al. |
| 2004/0243588 A1 | 12/2004 | Tanner et al. |
| 2004/0261116 A1 | 12/2004 | Mckeown et al. |
| 2005/0004805 A1 | 1/2005 | Srinivasan |
| 2005/0010555 A1 | 1/2005 | Gallivan |
| 2005/0021397 A1 | 1/2005 | Cui et al. |
| 2005/0027633 A1 | 2/2005 | Fortuna et al. |
| 2005/0049991 A1 | 3/2005 | Aggarwal |
| 2005/0050027 A1 | 3/2005 | Yeh et al. |
| 2005/0065809 A1 | 3/2005 | Henze |
| 2005/0144067 A1 | 6/2005 | Farahat et al. |
| 2005/0154664 A1 | 7/2005 | Guy et al. |
| 2005/0192008 A1 | 9/2005 | Desai et al. |
| 2005/0197954 A1 | 9/2005 | Maitland et al. |
| 2005/0201272 A1 | 9/2005 | Wang et al. |
| 2005/0204041 A1 | 9/2005 | Blinn et al. |
| 2005/0204381 A1 | 9/2005 | Ludvig et al. |
| 2005/0209922 A1 | 9/2005 | Hofmeister |
| 2005/0216582 A1 | 9/2005 | Toomey et al. |
| 2005/0222900 A1 | 10/2005 | Fuloria et al. |
| 2005/0222906 A1 | 10/2005 | Chen |
| 2005/0251820 A1 | 11/2005 | Stefanik et al. |
| 2005/0257250 A1* | 11/2005 | Mitchell et al. .................. 726/3 |
| 2005/0273849 A1* | 12/2005 | Araujo et al. .................. 726/12 |
| 2005/0278743 A1 | 12/2005 | Flickinger et al. |
| 2005/0288954 A1 | 12/2005 | McCarthy et al. |
| 2005/0288998 A1 | 12/2005 | Verma et al. |
| 2006/0004626 A1 | 1/2006 | Holmen et al. |
| 2006/0004731 A1 | 1/2006 | Seibel et al. |
| 2006/0020611 A1 | 1/2006 | Gilbert et al. |
| 2006/0041443 A1 | 2/2006 | Horvath |
| 2006/0059073 A1 | 3/2006 | Walzak |
| 2006/0074991 A1 | 4/2006 | Lussier et al. |
| 2006/0080233 A1 | 4/2006 | Mendelovich et al. |
| 2006/0080251 A1 | 4/2006 | Fried et al. |
| 2006/0085454 A1 | 4/2006 | Blegen et al. |
| 2006/0095363 A1 | 5/2006 | May |
| 2006/0100954 A1 | 5/2006 | Schoen |
| 2006/0122921 A1 | 6/2006 | Comerford et al. |
| 2006/0136528 A1 | 6/2006 | Martin et al. |
| 2006/0155639 A1 | 7/2006 | Lynch et al. |
| 2006/0173772 A1 | 8/2006 | Hayes et al. |
| 2006/0178971 A1 | 8/2006 | Owen et al. |
| 2006/0178983 A1 | 8/2006 | Nice et al. |
| 2006/0195866 A1 | 8/2006 | Thukral |
| 2006/0206379 A1 | 9/2006 | Rosenberg |
| 2006/0212350 A1 | 9/2006 | Ellis et al. |
| 2006/0212353 A1 | 9/2006 | Roslov et al. |
| 2006/0224696 A1 | 10/2006 | King et al. |
| 2006/0229943 A1 | 10/2006 | Mathias et al. |
| 2006/0229996 A1 | 10/2006 | Keithley et al. |
| 2006/0230415 A1 | 10/2006 | Roeding |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242050 A1 | 10/2006 | Haggerty et al. |
| 2006/0253323 A1 | 11/2006 | Phan et al. |
| 2006/0259364 A1 | 11/2006 | Strock et al. |
| 2006/0265495 A1 | 11/2006 | Butler et al. |
| 2006/0271472 A1 | 11/2006 | Cagan |
| 2006/0276171 A1 | 12/2006 | Pousti |
| 2006/0277092 A1 | 12/2006 | Williams |
| 2006/0282328 A1 | 12/2006 | Gerace et al. |
| 2006/0282359 A1 | 12/2006 | Nobili et al. |
| 2006/0282856 A1 | 12/2006 | Errico et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0016518 A1 | 1/2007 | Atkinson et al. |
| 2007/0022032 A1 | 1/2007 | Anderson et al. |
| 2007/0033227 A1 | 2/2007 | Gaito et al. |
| 2007/0038516 A1 | 2/2007 | Apple et al. |
| 2007/0061195 A1 | 3/2007 | Liu et al. |
| 2007/0061243 A1 | 3/2007 | Ramer et al. |
| 2007/0067297 A1 | 3/2007 | Kublickis |
| 2007/0067437 A1 | 3/2007 | Sindambiwe |
| 2007/0078835 A1 | 4/2007 | Donnelli |
| 2007/0118393 A1 | 5/2007 | Rosen et al. |
| 2007/0121843 A1 | 5/2007 | Atazky et al. |
| 2007/0124235 A1 | 5/2007 | Chakraborty et al. |
| 2007/0156515 A1 | 7/2007 | Hasselback et al. |
| 2007/0156554 A1 | 7/2007 | Nikoley et al. |
| 2007/0156589 A1 | 7/2007 | Zimler et al. |
| 2007/0157107 A1 | 7/2007 | Bishop |
| 2007/0157110 A1 | 7/2007 | Gandhi et al. |
| 2007/0168246 A1 | 7/2007 | Haggerty et al. |
| 2007/0169189 A1 | 7/2007 | Crespo et al. |
| 2007/0174122 A1 | 7/2007 | Howard et al. |
| 2007/0185797 A1 | 8/2007 | Robinson |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0208729 A1 | 9/2007 | Martino |
| 2007/0220553 A1 | 9/2007 | Branam et al. |
| 2007/0220611 A1 | 9/2007 | Socolow et al. |
| 2007/0226093 A1 | 9/2007 | Chan et al. |
| 2007/0226130 A1 | 9/2007 | Haggerty et al. |
| 2007/0233857 A1 | 10/2007 | Cheng et al. |
| 2007/0244732 A1 | 10/2007 | Chatterji et al. |
| 2007/0271582 A1 | 11/2007 | Ellis et al. |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288360 A1 | 12/2007 | Seeklus |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0299759 A1 | 12/2007 | Kelly |
| 2007/0299771 A1 | 12/2007 | Brody |
| 2008/0005313 A1 | 1/2008 | Flake et al. |
| 2008/0010206 A1 | 1/2008 | Coleman |
| 2008/0021802 A1 | 1/2008 | Pendleton |
| 2008/0027824 A1 | 1/2008 | Callaghan et al. |
| 2008/0028067 A1 | 1/2008 | Berkhin et al. |
| 2008/0052182 A1 | 2/2008 | Marshall |
| 2008/0059224 A1 | 3/2008 | Schechter |
| 2008/0059317 A1 | 3/2008 | Chandran et al. |
| 2008/0059352 A1 | 3/2008 | Chandran |
| 2008/0065569 A1 | 3/2008 | Dutt et al. |
| 2008/0065774 A1 | 3/2008 | Keeler |
| 2008/0086368 A1 | 4/2008 | Bauman et al. |
| 2008/0086523 A1 | 4/2008 | Afergan et al. |
| 2008/0091535 A1 | 4/2008 | Heiser et al. |
| 2008/0097928 A1 | 4/2008 | Paulson |
| 2008/0120155 A1 | 5/2008 | Pliha |
| 2008/0126476 A1 | 5/2008 | Nicholas et al. |
| 2008/0133325 A1 | 6/2008 | De et al. |
| 2008/0134042 A1 | 6/2008 | Jankovich |
| 2008/0167956 A1 | 7/2008 | Keithley |
| 2008/0172324 A1 | 7/2008 | Johnson |
| 2008/0177836 A1 | 7/2008 | Bennett |
| 2008/0183504 A1 | 7/2008 | Highley |
| 2008/0183564 A1 | 7/2008 | Tien et al. |
| 2008/0184289 A1 | 7/2008 | Cristofalo et al. |
| 2008/0215470 A1 | 9/2008 | Sengupta et al. |
| 2008/0221970 A1 | 9/2008 | Megdal et al. |
| 2008/0221990 A1 | 9/2008 | Megdal et al. |
| 2008/0228556 A1 | 9/2008 | Megdal et al. |
| 2008/0228635 A1 | 9/2008 | Megdal et al. |
| 2008/0255897 A1 | 10/2008 | Megdal et al. |
| 2008/0294540 A1 | 11/2008 | Celka et al. |
| 2008/0301016 A1 | 12/2008 | Durvasula et al. |
| 2008/0301727 A1 | 12/2008 | Cristofalo et al. |
| 2009/0006475 A1 | 1/2009 | Udezue et al. |

(56) References Cited

U.S. PATENT DOCUMENTS

| | | |
|---|---|---|
| 2009/0018996 A1 | 1/2009 | Hunt et al. |
| 2009/0024505 A1 | 1/2009 | Patel et al. |
| 2009/0043637 A1 | 2/2009 | Eder |
| 2009/0044246 A1 | 2/2009 | Sheehan et al. |
| 2009/0060343 A1 | 3/2009 | Rosca |
| 2009/0076883 A1 | 3/2009 | Kilger et al. |
| 2009/0089205 A1 | 4/2009 | Bayne |
| 2009/0094640 A1 | 4/2009 | Anderson et al. |
| 2009/0112650 A1 | 4/2009 | Iwane |
| 2009/0113532 A1* | 4/2009 | Lapidous ................. 726/7 |
| 2009/0119169 A1 | 5/2009 | Chandratillake et al. |
| 2009/0119199 A1 | 5/2009 | Salahi |
| 2009/0132559 A1 | 5/2009 | Chamberlain et al. |
| 2009/0133058 A1 | 5/2009 | Kouritzin et al. |
| 2009/0144102 A1 | 6/2009 | Lopez |
| 2009/0144201 A1 | 6/2009 | Gierkink et al. |
| 2009/0150238 A1 | 6/2009 | Marsh et al. |
| 2009/0172035 A1 | 7/2009 | Lessing et al. |
| 2009/0177480 A1 | 7/2009 | Chen et al. |
| 2009/0198557 A1 | 8/2009 | Wang et al. |
| 2009/0198602 A1 | 8/2009 | Wang et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0240609 A1 | 9/2009 | Cho et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0249440 A1* | 10/2009 | Platt et al. ................. 726/1 |
| 2009/0271248 A1 | 10/2009 | Sherman et al. |
| 2009/0276233 A1 | 11/2009 | Brimhall et al. |
| 2009/0276368 A1 | 11/2009 | Martin et al. |
| 2009/0288109 A1 | 11/2009 | Downey et al. |
| 2009/0313163 A1 | 12/2009 | Wang et al. |
| 2009/0327120 A1 | 12/2009 | Eze et al. |
| 2010/0010935 A1 | 1/2010 | Shelton |
| 2010/0017300 A1 | 1/2010 | Bramlage et al. |
| 2010/0037255 A1 | 2/2010 | Sheehan et al. |
| 2010/0094704 A1* | 4/2010 | Subramanian et al. .... 705/14.45 |
| 2010/0094758 A1 | 4/2010 | Chamberlain et al. |
| 2010/0094774 A1 | 4/2010 | Jackowitz et al. |
| 2010/0114663 A1 | 5/2010 | Casas et al. |
| 2010/0138290 A1 | 6/2010 | Zschocke et al. |
| 2010/0145840 A1 | 6/2010 | Kasower |
| 2010/0145847 A1 | 6/2010 | Zarikian et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0250434 A1 | 9/2010 | Megdal et al. |
| 2010/0250497 A1 | 9/2010 | Redlich et al. |
| 2010/0268660 A1 | 10/2010 | Ekdahl |
| 2010/0332292 A1 | 12/2010 | Anderson |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0047071 A1 | 2/2011 | Choudhuri et al. |
| 2011/0060905 A1 | 3/2011 | Stack et al. |
| 2011/0071950 A1 | 3/2011 | Ivanovic |
| 2011/0076663 A1 | 3/2011 | Krallman et al. |
| 2011/0078073 A1 | 3/2011 | Annappindi et al. |
| 2011/0093383 A1 | 4/2011 | Haggerty et al. |
| 2011/0112958 A1 | 5/2011 | Haggerty et al. |
| 2011/0125595 A1* | 5/2011 | Neal et al. ................. 705/14.73 |
| 2011/0137760 A1 | 6/2011 | Rudie et al. |
| 2011/0137789 A1 | 6/2011 | Kortina et al. |
| 2011/0145122 A1 | 6/2011 | Haggerty et al. |
| 2011/0164746 A1 | 7/2011 | Nice et al. |
| 2011/0178899 A1 | 7/2011 | Huszar |
| 2011/0184838 A1 | 7/2011 | Winters et al. |
| 2011/0213641 A1 | 9/2011 | Metzger, II et al. |
| 2011/0219421 A1 | 9/2011 | Ullman et al. |
| 2011/0251946 A1 | 10/2011 | Haggerty et al. |
| 2011/0258050 A1 | 10/2011 | Chan et al. |
| 2011/0264581 A1 | 10/2011 | Clyne |
| 2011/0270618 A1 | 11/2011 | Banerjee et al. |
| 2011/0307397 A1 | 12/2011 | Benmbarek |
| 2012/0011056 A1 | 1/2012 | Ward et al. |
| 2012/0011158 A1 | 1/2012 | Avner et al. |
| 2012/0016948 A1 | 1/2012 | Sinha |
| 2012/0047219 A1 | 2/2012 | Feng et al. |
| 2012/0054592 A1 | 3/2012 | Jaffe et al. |
| 2012/0066065 A1 | 3/2012 | Switzer |
| 2012/0110677 A1 | 5/2012 | Abendroth et al. |
| 2012/0136763 A1 | 5/2012 | Megdal et al. |
| 2012/0158574 A1 | 6/2012 | Brunzell et al. |
| 2012/0179536 A1 | 7/2012 | Kalb et al. |
| 2012/0216125 A1 | 8/2012 | Pierce |
| 2012/0239497 A1 | 9/2012 | Nuzzi |
| 2012/0239515 A1 | 9/2012 | Batra et al. |
| 2012/0265607 A1 | 10/2012 | Belwadi |
| 2012/0323954 A1 | 12/2012 | Bonalle et al. |
| 2013/0066676 A1 | 3/2013 | Williams et al. |
| 2013/0080315 A1 | 3/2013 | Torrez et al. |
| 2013/0080467 A1 | 3/2013 | Carson et al. |
| 2013/0085804 A1 | 4/2013 | Leff et al. |
| 2013/0132151 A1 | 5/2013 | Stibel et al. |
| 2013/0173450 A1 | 7/2013 | Celka et al. |
| 2013/0173481 A1 | 7/2013 | Hirtenstein et al. |
| 2013/0218638 A1 | 8/2013 | Kilger et al. |
| 2013/0218751 A1 | 8/2013 | Chaudhuri et al. |
| 2014/0025815 A1 | 1/2014 | Low |
| 2014/0032265 A1 | 1/2014 | Paprocki et al. |
| 2014/0096249 A1 | 4/2014 | Dupont et al. |
| 2014/0164398 A1 | 6/2014 | Smith et al. |

FOREIGN PATENT DOCUMENTS

| | | |
|---|---|---|
| EP | 0 419 889 | 4/1991 |
| EP | 0 458 698 | 11/1991 |
| EP | 0 554 083 | 8/1993 |
| EP | 0 559 358 | 9/1993 |
| EP | 0 749 081 | 12/1996 |
| EP | 0 977 128 | 2/2000 |
| EP | 1 028 401 | 8/2000 |
| EP | 1 077 419 | 2/2001 |
| EP | 1 122 664 | 8/2001 |
| EP | 0 772 836 | 12/2001 |
| EP | 2 088 743 | 8/2009 |
| JP | 10-222559 | 8/1998 |
| JP | 10-261009 | 9/1998 |
| JP | 10-293732 | 11/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| WO | WO 91/03789 | 3/1991 |
| WO | WO 94/06103 | 3/1994 |
| WO | WO 95/34155 | 12/1995 |
| WO | WO 96/00945 | 1/1996 |
| WO | WO 97/23838 | 7/1997 |
| WO | WO 98/41931 | 9/1998 |
| WO | WO 98/41932 | 9/1998 |

(56) References Cited

FOREIGN PATENT DOCUMENTS

| | | |
|---|---|---|
| WO | WO 98/41933 | 9/1998 |
| WO | WO 98/49643 | 11/1998 |
| WO | WO 99/04350 | 1/1999 |
| WO | WO 99/17225 | 4/1999 |
| WO | WO 99/17226 | 4/1999 |
| WO | WO 99/22328 | 5/1999 |
| WO | WO 99/33012 | 7/1999 |
| WO | WO 99/38094 | 7/1999 |
| WO | WO 00/04465 | 1/2000 |
| WO | WO 00/28441 | 5/2000 |
| WO | WO 00/55789 | 9/2000 |
| WO | WO 00/55790 | 9/2000 |
| WO | WO 01/10090 | 2/2001 |
| WO | WO 01/11522 | 2/2001 |
| WO | WO 01/75754 | 10/2001 |
| WO | WO 01/84281 | 11/2001 |
| WO | WO 03/101123 | 12/2003 |
| WO | WO 2004/114160 | 12/2004 |
| WO | WO 2006/110873 | 10/2006 |
| WO | WO 2007/149941 | 12/2007 |
| WO | WO 2008/022289 | 2/2008 |
| WO | WO 2008/054403 | 5/2008 |
| WO | WO 2008/076343 | 6/2008 |
| WO | WO 2008/127288 | 10/2008 |
| WO | WO 2008/147918 | 12/2008 |
| WO | WO 2009/117518 | 9/2009 |
| WO | WO 2009/132114 | 10/2009 |
| WO | WO 2010/045160 | 4/2010 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |

OTHER PUBLICATIONS

U.S. Appl. No. 12/705,511, filed Feb. 12, 2010, Bargoli et al.
BackupBox, http://mybackupbox.com printed Feb. 8, 2013 in 2 pages.
BBC Green Home, "My Action Plan", as printed from The Wayback Machine at http://web.archive.org/web/20080513014731/http://www.bbcgreen.com/actionplan, May 13, 2008, pp. 50.
Berr: Department for Business Enterprise & Regulatory Reform, "Regional Energy Consumption Statistics", Jun. 10, 2008, http://webarchive.nationalarchives.gov.uk/20080610182444/http://www.berr.gov.uk/energy/statistics/regional/index.html.
Bult et al., "Optimal Selection for Direct Mail," Marketing Science, 1995, vol. 14, No. 4, pp. 378-394.
Caliendo, et al., "Some Practical Guidance for the Implementation of Propensity Score Matching", IZA: Discussion Paper Series, No. 1588, Germany, May 2005, pp. 32.
"Carbon Calculator—Calculation Explanation," Warwick University Carbon Footprint Project Group, 2005, pp. 5, http://www.carboncalculator.co.uk/explanation.php.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
"Debt Settlement: Watch Video on how to Pay Your Debt Faster", http://www.debtconsolidationcare.com/debt-settlement.html printed Jan. 9, 2013 in 6 pages.
Egol, Len; "What's New in Database Marketing Software," Direct, Aug. 1994, vol. 6, No. 8, p. 39(4).
Elmasri et al., "Fundamentals of Database Systems, Third Edition (Excerpts)", Jun. 2000, pp. 253, 261, 268-270, 278-280, 585, 595.
Energy Saving TrustTM, "HEED Online User Manual (1.7)", Jul. 24, 2008, pp. 18, www.energysavingtrust.org.uk, Jul. 24, 2008.
Ettorre, Paul Kahn on Exceptional Marketing, Management Review, vol. 38(11), Nov. 1994, pp. 48-51.
Experian-Scorex Announces New Credit Simulation Tool, PR Newswire, Costa Mesa, CA, Jun. 13, 2005.
Fanelli, Marc, "Building a Holistic Customer View", MultiChannel Merchant, Jun. 26, 2006, pp. 2.
Fisher, Joseph, "Access to Fair Credit Reports: Current Practices and Propsed Legislation," American Business Law Journal, Fall 1981, vol. 19, No. 3, p. 319.
Gonul, et al., "Optimal Mailing of Catalogs: A New Methodology Using Estimable Structural Dynamic Programming Models", 14 pages, Management Science, vol. 44, No. 9, Sep. 1998.
Haughton et al., "Direct Marketing Modeling with CART and CHAID", Journal of Direct Marketing, Fall 1997, vol. 11, No. 4, pp. 42-52.
Hojoki, http://hojoki.com printed Feb. 8, 2013 in 5 pages.
Ideon, Credit-Card Registry that Bellyflopped this Year, Is Drawing some Bottom-Fishers, The Wall Street Journal, Aug. 21, 1995, pp. C2.
IFTTT, "About IFTTT", http://ifttt.com/wtf printed Feb. 18, 2013 in 4 pages.
Instant Access to Credit Reports Now Available Online with DMS' CreditBrowser-based system also Simplifies Credit Decisioning and Offers a Central Point of Control, Business Wire, p. 0264, Dallas, May 23, 2000.
"Intelligent Miner Applications Guide", IBM Corp., Apr. 2, 1999, Chapters 4-7, pp. 33-132.
"Japan's JAAI system appraises used cars over internet", Asia Pulse, Mar. 3, 2000.
Jowit, Juliette, "Ever wondered how big your own carbon footprint might be?", Nov. 4, 2007, pp. 4, http://www.guardian.co.uk/money/2007/nov/04/cash.carbonfootprints/print.
Klein, et al., "A Constant-Utility Index of the Cost of Living", The Review of Economic Studies, pp. 84-87, vol. XV-XVI, Kraus Reprint Corporation, New York, 1960.
Klein et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Lamons, Bob, "Be Smart: Offer Inquiry Qualification Services," Marketing News, ABI/Inform Global, Nov. 6, 1995, vol. 29, No. 23, pp. 13.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Loshin, Intelligent Enterprise: Better Insight for Business Decisions, "Value-Added Data: Merge Ahead", Feb. 9, 2000, vol. 3, No. 3, 5 pages.
Miller, Joe, "NADA used-car prices go online", Automotive News, Jun. 14, 1999, p. 36.
Mint.com, http://www.mint.com/how-it-works/ printed Feb. 5, 2013 in 2 pages.
Mover, "One API for the Cloud", http://mover.io printed Feb. 6, 2013 in 3 pages.
Muus, et al., "A Decision Theoretic Framework for Profit Maximization in Direct Marketing", Sep. 1996, pp. 20.
Otixo, "Your Dashboard for the Cloud", http://Otixo.com/product printed Feb. 6, 2013 in 3 pages.
Pipes, http://pipes.yahoo.com/pipes printed Feb. 18, 2013 in 1 page.
Planwise, http://planwise.com printed Feb. 8, 2013 in 5 pages.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
"PremierGuide Announces Release 3.0 of Local Search Platform", Business Wire, Mar. 4, 2004, Palo Alto, CA, p. 5574.
Primadesk, http://primadesk.com printed Feb. 8, 2013 in 1 page.
"Qualifying for Debt Settlement", http://www.certifieddebt.com/debt/settlement-qualifications.shtml printed Jan. 9, 2013 in 2 pages.
"Resolve Debt for Less: With Help from Freedom Financial" http://www.debtsettlementusa.com/ printed Jan. 9, 2013 in 6 pages.
SalesLogix.net, SalesLogix Sales Tour, http://web.archive.org/web/20010411115938/www.saleslogix.com/home/index.php3celli . . . as printed on Aug. 30, 2005, Apr. 2000, 19 Pgs.
Sawyers, Arlene, "NADA to Offer Residual Guide", Automotive News, May 22, 2000, p. 3.

(56) References Cited

OTHER PUBLICATIONS

Sax, Michael M., Data Collection and Privacy Protection: An International Perspective, Presentation: Managing Online Risk and Liability Conference, Aug. 31, 1999, pp. 58.
Schmittlein et al., "Customer Base Analysis: An Industrial Purchase Process Application", Marketing Science, vol. 13, No. 1 (Winter 1994), pp. 41-67.
"Settling Your Debts—Part 1 in Our Debt Settlement Series", http://www.creditinfocenter.com/debt/settle_debts.shtml printed Jan. 9, 2013 in 6 pages.
ServiceObjects, "DOTS Web Services—Product Directory", http://www.serviceobjects.com/products/directory_of_web_services.asp printed Aug.17, 2006 in 4 pages.
Storage Made Easy(SME), http://storagemadeeasy.com printed Feb. 6, 2013 in 1 page.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
Stone, "Linear Expenditure Systems and Demand Analysis: An Application to the Pattern of British Demand", The Economic Journal: The Journal of the Royal Economic Society, Sep. 1954, pp. 511-527, vol. LXIV, Macmillan & Co., London.
Sweat, Jeff; "Know Your Customers," Information Week, Nov. 30, 1998, pp. 20.
Tao, Lixin, "Shifting Paradigms with the Application Service Provider Model"; Concordia University, IEEE, Oct. 2001, Canada.
Thoemmes, Felix, "Propensity Score Matching in SPSS", Center for Educational Science and Psychology, University of Tübingen, Jan. 2012.
"WashingtonPost.com and Cars.com launch comprehensive automotive web site for the Washington area", PR Newswire, Oct. 22, 1998.
Wiedmann, et al., "Report No. 2: The use of input-output analysis in REAP to allocate Ecological Footprints and material flows to final consumption categories", Resources and Energy Analysis Programme, Stockholm Environment Institute—York, Feb. 2005, York, UK, pp. 33.
Working, Holbrook, "Statistical Laws of Family Expenditure", Journal of the American Statistical Association, pp. 43-56, vol. 38, American Statistical Association, Washington, D.C., Mar. 1943.
Zapier, "Integrate Your Web Services", http://www.Zapier.com, printed Feb. 18, 2013 in 3 pages.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US10/34434, dated Jun. 23, 2010.
Buxfer, http://www.buxfer.com/ printed Feb. 5, 2014 in 1 page.
Check, http://check.me/ printed Feb. 5, 2014 in 3 pages.
International Preliminary Report on Patentability for Application No. PCT/US2010/034434, dated Feb. 4, 2014.
Manilla, http://www.manilla.com/how-it-works/ printed Feb. 5, 2014 in 1 page.
Mvelopes, http://www.mvelopes.com/ printed Feb. 5, 2014 in 2 pages.
PersonalCapital.com, http://www.personalcapital.com/how-it-works printed Feb. 5, 2014 in 5 pages.
YODLEE | Money Center, https://yodleemoneycenter.com/ printed Feb. 5, 2014 in 2 pages.
You Need a Budget, http://www.youneedabudget.com/features printed Feb. 5, 2014 in 3 pages.
U.S. Appl. No. 60/146,074, filed Jul. 28, 1999, Tomkow.
U.S. Appl. No. 60/172,479, filed Dec. 17, 1999, Tomkow.
"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.
"Accenture Newsroom: Accenture Completes Acquisition of Media Audits: Acquisition Expands Company's Marketing Sciences and Data Services Capabilities," ACCENTURE.COM, Dec. 12, 2005, 2 pages, http://accenture.tekgroup.com/article_display.cfm?article_id=428.
"Aggregate and Analyze Social Media Content: Gain Faster and Broader Insight to Market Sentiment," SAP Partner, Mantis Technology Group, Apr. 2011, pp. 4.
Akl, Selim G., "Digital Signatures: A Tutorial Survey," Computer, Feb. 1983, pp. 15-24.
Applied Geographic Solutions, "What is MOSAIC™", as captured Feb. 15, 2004 from http://web.archive.org/web/20040215224329/http://www.appliedgeographic.com/mosaic.html in 2 pages.
"Atlas on Demand, Concurrent, and Everstream Strike Video-On-Demand Advertising Alliance", www.atlassolutions.com, Jul. 13, 2006, 3 pages.
"Arbitron 2006 Black Consumers," Arbitron Inc., LVTSG.COM, Jul. 8, 2006, 2 pages, http://www.lvtsg.com/news/publish/Factoids/article_3648.shtml.
"Atlas on Demand and C-COR Join Forces to Offer Advertising Management Solution for On Demand TV: Global Provider of On Demand Systems Partners with Atlas to Develop and Market Comprehensive VOD Advertising Solution," Jul. 25, 2005 in 3 pages, www.atlassolutions.com.
"Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar" Jun. 22, 2006 in 3 pages, http://www.atlassolutions.com/news_20060622.aspx.
Adzilla, Press Release, "ZILLACASTING Technology Approved and Patent Pending," http://www.adzilla.com/newsroom/pdf/patent_051605.pdf, May 16, 2005, pp. 2.
AFX New Limited—AFX International Focus, "Nielsen moving to measure off-TV viewing," Jun. 14, 2006, 1 page.
Axiom, "Capabilites", http://www.axiomcom.com/capabilities/, printed May 7, 2015 in 2 pages.
Bachman, Katy, "Arbitron, VNU Launch Apollo Project," MEDIAWEEK.COM Jan. 17, 2006, 3 pages, http://www.mediaweek.com/mw/search/article_display.jsp?schema=&vnu_content_id=1001847353.
Bank of America Launches Total Security Protection™; Features Address Cardholders' Financial Safety Concerns; Supported by $26 Million National Advertising Campaign; Free Educational Materials, PR Newswire, Oct. 9, 2002, pp. 2.
Bitran et al., "Mailing Decisions in Catalog Sales Industry", Management Science (JSTOR), vol. 42, No. 9, pp. 1364-1381, Sep. 1996.
Blackbaud.com, www.blackbaud.com, various pages, retrieved Jan. 22, 2009 from.www.archive.org, 23 pages.
Burr Ph.D., et al., "Utility Payments as Alternative Credit Data: A Reality Check", Asset Builders of America, Inc., Oct. 5, 2006, pp. 1-18, Washington, D.C.
"Cable Solution Now, The Industry Standard for Information Management: Strata's TIM.net Crosses Important Threshold Dominant Solution for All Top 20 TV Markets," STRATAG.COM, Apr. 28, 2006, 1 page, http://stratag.com/news/cablepress042806.html.
Card Marketing, Use the Latest CRM Tools and Techniques, www.CardForum.com, vol. 5 No. 10, Dec. 2001.
ChannelWave.com, PRM Central—About PRM, http://web.archive.org/web/20000510214859/http://www.channelwave.com as printed on Jun. 21, 2006, May 2000 Archive.
Chung, Charles; Internet Retailer, "Multi-channel retailing requires the cleanest data—but don't expect it from the customer", Jan./Feb. 2002.
"Claritas Forms Life Insurance Consortium with Worldwide Financial Services Association: Initiative with LIMRA International is First of its Kind to Provide Actual Sales Information at Small Geographic Areas," CLARITAS.COM, Feb. 9, 2006, 3 pages, http.
"Claritas Introduces PRIZM NE Consumer Electronic Monitor Profiles: New Information Product Provides Insight Into The Public's Purchasing Behaviors of Consumer Electronics," CLARITAS.COM, May 30, 2006, 3 pages.
Click Z, "ISPs Collect User Data for Behavioral Ad Targeting," dated Jan. 3, 2008, printed from http://www.clickz.com/showPage.html?page=clickz.

(56) References Cited

OTHER PUBLICATIONS

CNET NEWS.COM, "Target me with your ads, please," dated Dec. 5, 2007, printed from http://www.news.com/2102-1024_3-6221241.html?tag+st.util.print.
Creamer, Matthew; Consulting in marketing; Accenture, Others Playing Role in Firms' Processes, Crain's Chicago Business, Jun. 12, 2006, 2 pages.
Culhane, Patrick, "Data: Powerfully Linking Service and Profitability," Jul./Aug. 1996, Bank Management, vol. 72, No. 4, pp. 8-12.
"Database Marketing: A new Approach to the Old Relationships," Chain Storage Executive Edition, Dialogue, Sep. 1991, pp. 2.
Davies, Donald W., "Applying the RSA Digital Signature to Electronic Mail," Computer, Feb. 1983, pp. 55-62.
deGruchy, et al., "Geodemographic Profiling Benefits Stop-Smoking Service;" The British Journal of Healthcare Computing & Information Management; Feb. 2007; 24, 7; pp. 29-31.
Delany et al., "Firm Mines Offline Data to Target Online", http://web.archive.org/web/20071117140456/http://www.commercialalert.org/news/archive/2007/10/firm-mines-offline-data-to-target-online-ads, Commercial Alert, Oct. 17, 2007, pp. 3.
DEMOGRAPHICSNOW.COM, sample reports, "Age Rank Report", Jul. 17, 2006, 3 pages.
DEMOGRAPHICSNOW.COM, sample reports, "Consumer Expenditure Summary Report", Jul. 17, 2006, 3 pages.
DEMOGRAPHICSNOW.COM, sample reports, "Income Comparison Report", Jul. 17, 2006, 4 pages.
Drawbridge, "Customer Success", http://www.drawbrid.ge/customer-success, printed May 7, 2015 in 17 pages.
Drawbridge, "Solutions", http://www.drawbrid.ge/solutions, printed May 7, 2015 in 5 pages.
Drawbridge, "Technology", http://www.drawbrid.ge/technology, printed May 7, 2015 in 3 pages.
Dstillery, "Products", http://dstillery.com/how-we-do-it/products/ printed May 7, 2015 in 2 pages.
Dstillery, "What We Do", http://dstillery.com/what-we-do/, printed May 7, 2015 in 2 pages.
Dstillery, "Who We Are", http://dstillery.com/who-we-are/, printed May 7, 2015 in 2 pages.
Dymi, Amilda, Need for Leads Spurs Some Upgrades, Origination News-Special Report, May 1, 2008, vol. 17, Issue No. 8, pp. 24, Atlanta, Copyright 2008 SourceMedia, Inc.
"Epsilon Leads Discussion on Paradigm Shift in TV Advertising," EPSILON.COM, Jun. 24, 2004, 2 pages, http://www.epsilon.com/who-pr_tvad040624.html.
Experian and AGS Select SRC to Deliver Complete Marketing Solutions; Partnership First to Marketplace with Census2000 Data. PR Newswire. New York: Mar. 21, 2001. p. 1.
Frontporch, "Ad Networks-Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
Georges, et al., "KDD'99 Competition: Knowledge Discovery Contest", SAS Institute, 1999, 6 pages.
Halliday, Jean, "Ford Recruits Accenture for Marketing Plan," Automotive News Feb. 13, 2006, 2 pages, Crain Communications.
Hartfeil, Guenther, "Bank One Measures Profitability of Customers, Not Just Products," Journal of Retail Banking Services, Aug. 1996, vol. 18, No. 2, pp. 23-29.
Helm, Burt, "Nielsen's New Ratings Yardstick," BUSINESSWEEK.COM, Jun. 20, 2006, 3 pages, http://www.businessweek.com/technology/content/jun2006/tc20060620_054223.htm.
Hinman, Donald P., "The Perfect Storm: Response Metrics and Digital TV," CHIEFMARKETER.COM, May 17, 2006, 2 pages, http://www.chiefmarketer.com/crm_loop/roi/perfect-storm-051706/index.html.
Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, in 2 pages, http://us.infores.com/page/news/pr/pr_archive?mode=single<_id=117.
"IRI and Acxiom Introduce More Efficient and Actionable Approach to Consumer Segmentation and Targeted Marketing," EU-MARKETINGPORTAL.DE, Jan. 26, 2006, 2 pages, http://www.eu-marketinaportal.de.
Jost, Allen; Neural Networks, Credit World, Mar./Apr. 1993, vol. 81, No. 4, pp. 26-33.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
LeadVerifier: Why Should You Use LeadVerifier?, downloaded from http://web.archive.org/web/20060207103822/http://www.leadverifier.com/LeadVerifier_Why.asp, dated Feb. 7, 2006 in 2 pages.
Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
Littwin, Angela, "Beyond Usury: A Study of Credit-Card Use and Preference Among Low-Income Consumers", Texas Law Review, vol. 86, No. 3, pp. 451-506; Feb. 2008.
McManus et al.; "Street Wiser," American Demographics; ABI/Inform Global; Jul./Aug. 2003; 25, 6; pp. 32-35.
McNamara, Paul, "Start-up's pitch: The Envelope, please," Network World, Apr. 28, 1997, vol. 14, No. 17, p. 33.
"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.
Morrissey, Brian, "Aim High: Ad Targeting Moves to the Next Level", ADWEEK, dated Jan. 21, 2008 as downloaded from http://www.adweek.com/aw/magazine/article_display.isp?vnu on Apr. 16, 2008.
NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.
Otter, et al., "Direct Mail Selection by Joint Modeling of the Probability and Quantity of Response", Jun. 1997, pp. 14.
"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997.(retrieved Nov. 7, 2013) in 2 pages.
PR Web: Press Release Newswire, Anchor Launches LeadVerifier to Verify, Correct and Enhance Internet Leads, Jul. 19, 2005, pp. 2 pages, Farmingdale, NY.
Predictive Behavioral Targeting http://www.predictive-behavioraltargeting.com/index.php.Main_Page as printed Mar. 28, 2008 in 4 pages.
Reinbach, Andrew; MCIF aids banks in CRA Compliance, Bank Systems & Technology, Aug. 1995, vol. 32, Issue No. 8, pp. 27.
Rossi et al.; "The Value of Purchasing History Data in Target Marketing"; Marketing Science, Apr. 1996, vol. 15, No. 4, pp. 321-340.
Smith, Richard M., "The Web Bug FAQ", Nov. 11, 1999, Version 1.0, pp. 4.
"SRC Announces Free Dashups to Mashups Adding Geographic Business Intelligence at Web Speed to the Enterprise on www.FreeDemographics.com/API," DIRECTIONSMAG.COM, Jun. 12, 2006, 3 pages, http://www.directionsmag.com/press.releases/index.php?duty=Show&id=1.
"SRC Delivers Industry's First Drive Time Engine Developed to Follow Actual Road Networks," THOMASNET.COM, May 21, 2006, 4 pages, http://news.thomasnet.com/companystory/485722.
Stein, Benchmarking Default Prediction Models: Pitfalls and Remedies in Model Validation, Moody's KMV, Revised Jun. 13, 2002, Technical Report #020305; New York.
TARGUSinfo: Lead Verification, Verify Your Leads With Unique Accuracy and Ease, downloaded from www.targusinfo.com.solutions/verify/Default.asp, as printed Aug. 1, 2006.
TARGUSinfo: Solutions: Services: Verify Express—Verify, Correct and Enhance Customer Provided Data, downloaded from http://web.

(56) References Cited

OTHER PUBLICATIONS archive.org/web/20051028122545/http://www.targusinfo.com/solutions/services/verify/, Oct. 28, 2005 in 27 pages.

UPI, "Nielsen Media Research goes electronic," Jun. 14, 2006, 1 page.

"VOD Integration Now Available in Strata: Buyers / Sellers Benefit from VOD Component on Popular Platform," STRATAG.COM, Feb. 21, 2006, 1 page, http://www.stratag.com/news/mediapress022106.html.

Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.

White, Ron, "How Computers Work", Millennium Edition, Que Corporation, Indianapolis, IN, Sep. 1999. [Uploaded in 2 parts].

Whitney, Daisy; Atlas Positioning to Shoulder VOD Ads; Campaign Management Tools Optimize Inventory, TelevisionWeek, May 23, 2005, 3 pages.

Wyner, "Customer valuation: Linking behavior and economics", Aug. 1996, Marketing Research: A Magazine of Management & Applications vol. 8, No. 2 pp. 36-38.

Declaration of Paul Clark, DSc. for Inter Partes Review of U.S. Patent No. 8,504,628 (Symantec Corporation, Petitioner), dated Jan. 15, 2014 in 76 pages.

Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.

First Amended Complaint in Civil Action No. 2:12-cv-511-JRG (*Rpost Holdings, Inc. And Rpost Communications Limited* V. *Constant Contact, Inc.; et al.*) filed Feb. 11, 2013 in 14 pages.

First Amended Complaint in Civil Action No. 2:12-cv-511-JRG (*Rpost Holdings, Inc. And Rpost Communications Limited* V. *Epsilon Data Management, LLC.*) filed Sep. 13, 2013 in 9 pages.

First Amended Complaint in Civil Action No. 2:12-cv-513-JRG (*Rpost Holdings, Inc. And Rpost Communications Limited* V. *Experian Marketing Solutions, Inc.*) filed Aug. 30, 2013 in 9 pages.

Petition for Covered Business Method Patent Review in U.S. Patent No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.

Source Code Appendix attached to U.S. Appl. No. 08/845,722 by Venkatraman et al., Exhibit A, Part 1 & 2, pp. 32.

Official Communication in Canadian Patent Application No. 2,381,349 dated Jul. 31, 2014.

International Preliminary Examination Report in International Application No. PCT/US00/21453 dated, Jun. 26, 2001.

International Search Report and Written Opinion for Application No. PCT/US2007/021815, dated Sep. 5, 2008.

International Search Report and Written Opinion, PCT/US2008/064594 mailed Oct. 30, 2008.

International Preliminary Report and Written Opinion in PCT/US2008/064594, mailed Dec. 10, 2009.

International Search Report and Written Opinion in PCT/US08/083939, dated Jan. 29, 2009.

International Search Report and Written Opinion for Application No. PCT/US2013/052342, dated Nov. 21, 2013.

International Preliminary Report on Patentability for Application No. PCT/US2013/052342, dated Feb. 5, 2015.

\* cited by examiner

| Attribute - Key | Attribute - Value | Read Privilege | Modify Privilege |
|---|---|---|---|
| Audience ID | xfDDjklh348o | | |
| Last Visit to Site X | July 21, 2010 8:34 pm | Partner 1, 2, 3 | Partner 1 |
| Most Recent Purchase | From Site A | Partner 1, 2, 3, 4 | Partner 2 |
| Luxury Automobile Interest | YES | Partner 2, 3, 4 | Partner 1 |
| Continued Education Interest | NO | Partner 1 | Partner 1 |
| Membership Type of Platform 2 | Trial Membership | Partner 2, 4 | Partner 2 |
| Credit Score Band | 560-620 | Partner 3 | Partner 3 |
| | | | |
| | | | |

FIG. 6

SYSTEMS AND METHODS FOR PROCESSING CONSUMER INFORMATION FOR TARGETED MARKETING APPLICATIONS

CROSS-REFERENCE TO RELATED APPLICATIONS

This application is based upon and claims the benefit of priority from U.S. Provisional Patent Application No. 61/376,157 filed on Aug. 23, 2010, entitled "Shared Cookies With Entity-Specific Access Rights," the entire contents of which are hereby incorporated herein by reference in their entirety. All publications and patent applications mentioned in this specification are herein incorporated by reference in their entirety to the same extent as if each individual publication or patent application was specifically and individually indicated to be incorporated by reference.

BACKGROUND

1. Field

This disclosure relates in general to computer data processing, and in particular to computing systems and methods for coalescing and sharing of consumer data.

2. Description of the Related Art

Content providers often customize their content to consumers. For example, internet websites often customize content in order to increase their conversion rate, which measures the percentage of visitors taking affirmative actions to further engage the sites, such as by signing up for accounts or making purchases. As another example, many content providers implement an account login system that requests demographic information from consumers when they sign up, and uses such information to tailor content to the consumers. An e-commerce site may, for example, display different products based on the visitor's age and gender in order to increase sales. Similarly, on-line advertising networks may customize advertisements based on insights gained from tracking cookies stored on visitors' computers that monitor their browsing histories. The tailoring of content such as advertisements could lead to increased sales.

SUMMARY OF THE DISCLOSURE

Embodiments of the invention include systems and methods that enable the association and aggregation of consumer data gathered from online and offline sources. In particular, several embodiments are directed to linking consumer data in a data source controlled by an entity (e.g., such as a company's CRM (customer relationship management) database) to offline data sources such as demographic data, and/or online data sources such as online interaction data. In one embodiment, the linking is performed in an anonymous manner that preserves data privacy of the consumers, and relies at least in part on the linking of data from various sources associated with the individual consumers. The linking may be based on several identifiers (IDs) associated with the data sources. The systems and methods disclosed herein may perform the linking through one or more batch data operations, one or more real time data operations, and/or one or more of a combination of batch and real time data operations. The systems and methods disclosed herein thus facilitate the association of these disparate data sources and enable various entities to better tailor interactions with the consumers.

In various embodiments of the invention, a shared cookie data management system and method is disclosed. Entities that use cookies to track data related to consumer information may not share such data for a number of reasons, such as because the data is in a proprietary format. If entities do share, they typically share all or nothing. The various embodiments of the shared cookie data architecture disclosed herein eliminate the need to deploy different types of cookies with different types of scripts for different businesses. In one embodiment, the common, shared cookie can be used across various entities that have approved partner keys (entities that participate in the sharing are called "partners"). The common, shared cookie can contain data from multiple entities/parties, with individual data elements securely governed with access controls. In one embodiment, the data controls can be applied at the partner level or data level. A partner may have limited rights to a partner's data source versus having unlimited rights to that same data source. For example, one partner may have unlimited access to all data, but other partner may have only access to some rights. In one embodiment, the individual partners can define such rights. For example, a partner A may allow a partner B to access all or some of partner A's data, via the common cookie.

In one embodiment, each partner may use a "first party" cookie, which has only the partner's information, as well as a shared common cookie for storing data for sharing. The common cookie can allow third party data appends, based on the rights associated with the partner key. The data appends can be limited, unlimited, structured or free form. For example, a first partner may have data indicting that a user 1 has a high propensity to spend on electronic gadgets, but does not know more. With the sharing, the first partner can allow a second partner, via this third party append feature, to add its data related to user 1 to the shared data. For example, if the second partner has demographic and income range data for user 1, the second partner may indicate in the share cookie that user 1 is interested in premium consumer gadgets.

The data within the shared, common cookie can be updated in real time, at the time of transaction, with the data needed to support the transaction. This allows the common cookie to be utilized for multiple content and advertising purposes, and not limited by the data stored on the cookie or technical limitations of storing data on the cookie. In one embodiment, a partner can dynamically alter content of a shared cookie in real time based on access rights and functionality for transaction. This real time capability of the shared cookie is in contrast to common implementations, where cookies are static and incremental. For example, a shared cookie may have tens or hundreds of data elements with access control associated with at least some of them. Elements may be inserted into the cookie in real time from a database of consumer data which may include many more elements. Thus relevant elements may be provided, in real time, on an as-needed basis. In addition, if a partner has just conducted a transaction with a consumer associated with the cookie, the partner (if it has the proper access rights) can dynamically update those data elements (e.g., add, delete, revise).

BRIEF DESCRIPTION OF THE DRAWINGS

Specific embodiments of the invention will now be described with reference to the following drawings, which are intended to illustrate embodiments of the invention, but not limit the invention:

FIG. 6 illustrates example data attributes within the shared cookie architecture according to one embodiment;

DETAILED DESCRIPTION OF CERTAIN EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Below are figures that illustrate additional exemplary embodiments of the cookie management and consumer data sharing systems and methods. Any specific entities noted below are provided for illustration purposes only and should be interpreted to cover any other entity in place of, or in addition to, the noted entity. In other embodiments, multiple blocks that are illustrated as being performed by a single entity may be performed by multiple entities and, likewise, groups of blocks that are illustrated as being performed by multiple entities may be performed by a single entity. Additionally, depending on the embodiment, the systems and methods described herein may comprise fewer blocks or components than are illustrated or discussed.

Audience Intelligence System Architecture

Figure 1:
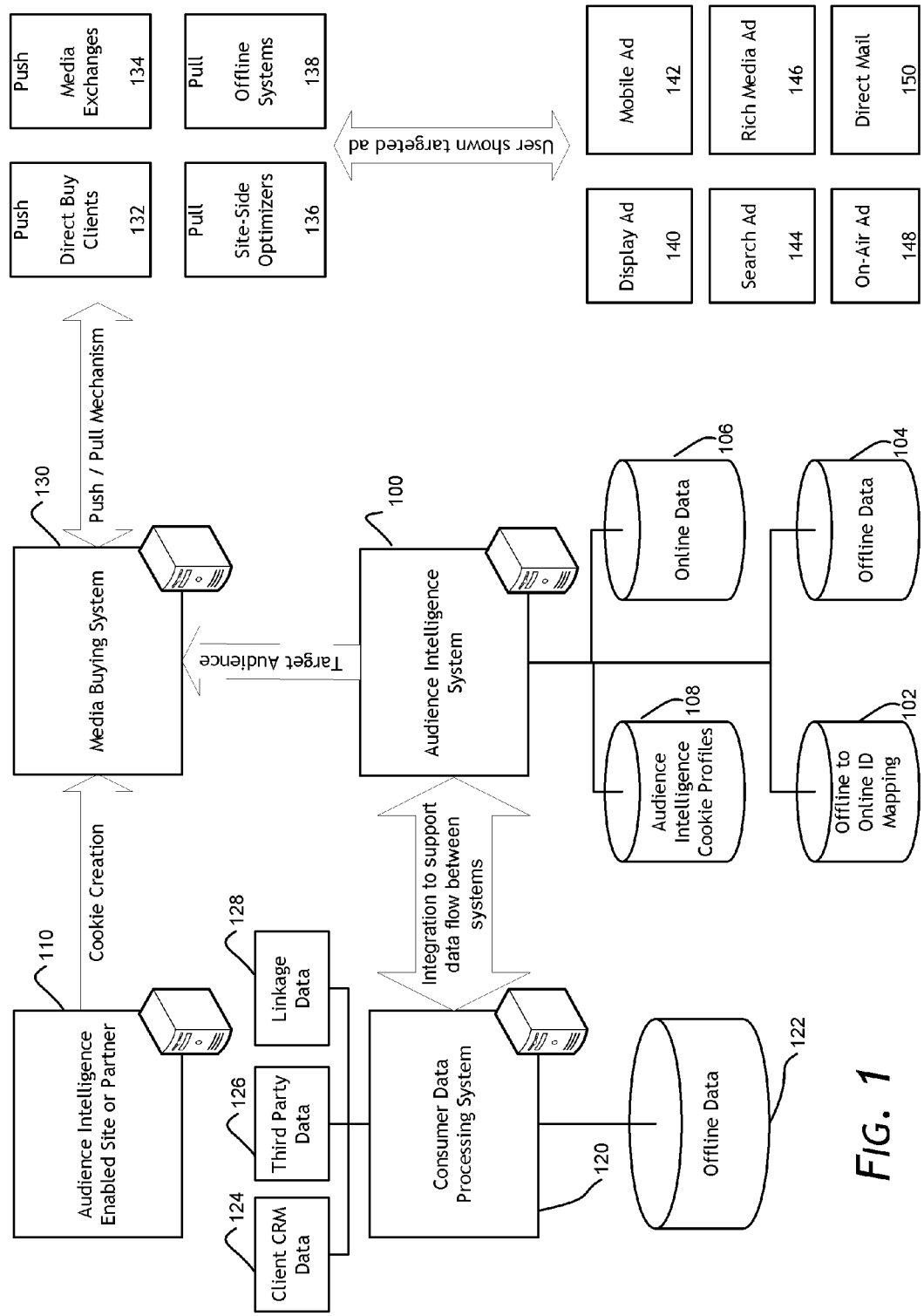
FIG. 1 is a block diagram illustrating one embodiment of an audience intelligence system and a consumer data processing system.
Figure 10:
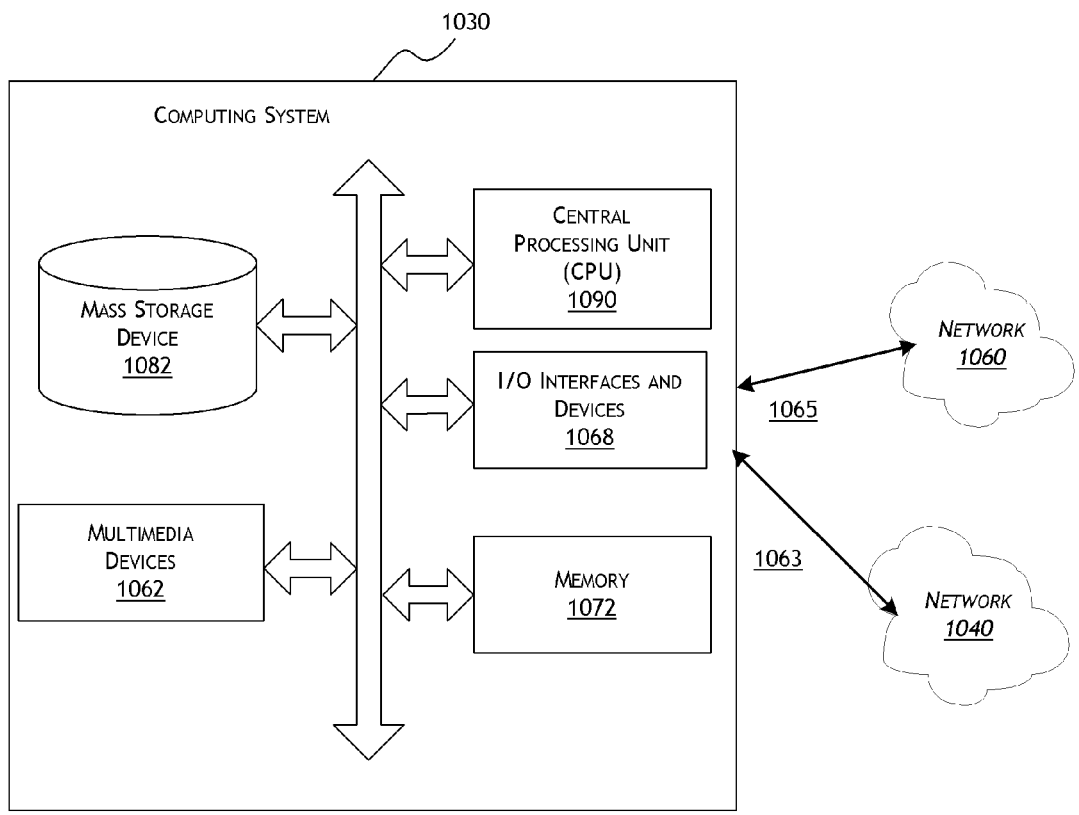
FIG. 10 is a block diagram illustrating a computing system in accordance with one embodiment.

FIG. 1 is a block diagram illustrating one embodiment of an audience intelligence system. The systems depicted in FIG. 1 may each be implemented in any suitable computing system, such as, for example, a desktop or laptop computer, a computer server, or a mobile computing device, such as a mobile phone, a PDA, or a smart phone. An example computing system is shown in FIG. 10. In addition, some of the systems may be combined into fewer systems than shown, or divided into more systems than shown. The communications links depicted in FIG. 1 may be through a wired or wireless connections and may be part of a secured network, such as a local area network (LAN) and/or a combination of networks, such as LANs, WANs, MANs and/or the Internet.

As shown, an audience intelligence system 100 is configured to use data from one or more data sources including an audience intelligence cookie profiles data source 108, an online data source 106, an offline to online ID mapping data source 102, and an offline data source 104. The audience intelligence system 100 may communicate with a batch processing system 120, which processes offline data 122. In one embodiment, the batch processing system 120 may also use a number of data sources including a client CRM (customer relationship management) data source 124, a third party data source 126, and a linkage data source 128. In one embodiment, the batch processing system 120 is configured to create mappings of these offline data sources to the online data 106, and such mappings is stored in offline to online ID mapping data source 102, as shown in FIG. 1. The mapping data may then be used by the audience intelligence system 100 for audience targeting and/or other custom advertising solutions. In addition, the linking of a large amount of offline data to online data enables better demographic modeling. The audience intelligence system 100 may use an audience intelligence system ID as the online ID and provide the audience intelligence system ID in a shared cookie to enable sharing of data from the various data sources connected to the audience intelligence system 100. In one embodiment, the batch processing system 120 provides to the audience intelligence system 100 a subset of offline data 122 that is linked to various consumers in the mappings, and the audience intelligence system 100 may store the subset of offline data in the offline data source 104.

In one embodiment, the audience intelligence system 100 is used to provide data related to, or associated with, one or more target audience(s) for a media buying system 130. The media buying system 130 may be, for example, an online ad exchange where online advertisement orders and/or online advertising campaigns can be initiated. As shown in FIG. 1, the media buying system 130 in one embodiment accepts a cookie from an audience intelligence enabled site or partner 110 as an input. The cookie, in one embodiment, provides data and or identifying information of a particular person within the target audience. The cookie may contain an audience intelligence system ID which in one embodiment provides a link to a data profile with the audience intelligence cookie profiles 108, which may be linked to the other data sources 102, 104, and 106. In one embodiment, the profiles include data that can be shared by multiple sites or partners, as will be furthered described below in FIGS. 5-9.

In one embodiment, the media buying system 130 uses that ID information, along with the data provided by the audience intelligence system 100, to customize online and/or offline advertising. Some of the examples are depicted in FIG. 1. For example, the media buying system 130 may support push/pull channels that output the target audience data to one or more of: direct buy clients 132, media exchanges 134, site-side optimizers 136, and offline systems 138. These push/pull channels, in one embodiment, output a variety of advertisements, including for example, an on line display ad 140, a mobile display ad 142, a search ad 144, a rich media ad 146, an on-air ad 148, and/or a direct mail advertisement 150. Other advertising methods and channels not shown in FIG. 1 may also used. For example, advertisements may be served through other consumer interaction channels such as social networks, phone marketing, game console networks, satellite or cable TV systems, and/or wireless communication systems such as wireless phone networks. In addition to customizing advertisements, the consumer data may also be used in other areas such as improving customer relationship management and helping companies better understand their customers and prospective customers.

Online—Off-line Data Mapping

Figure 2:
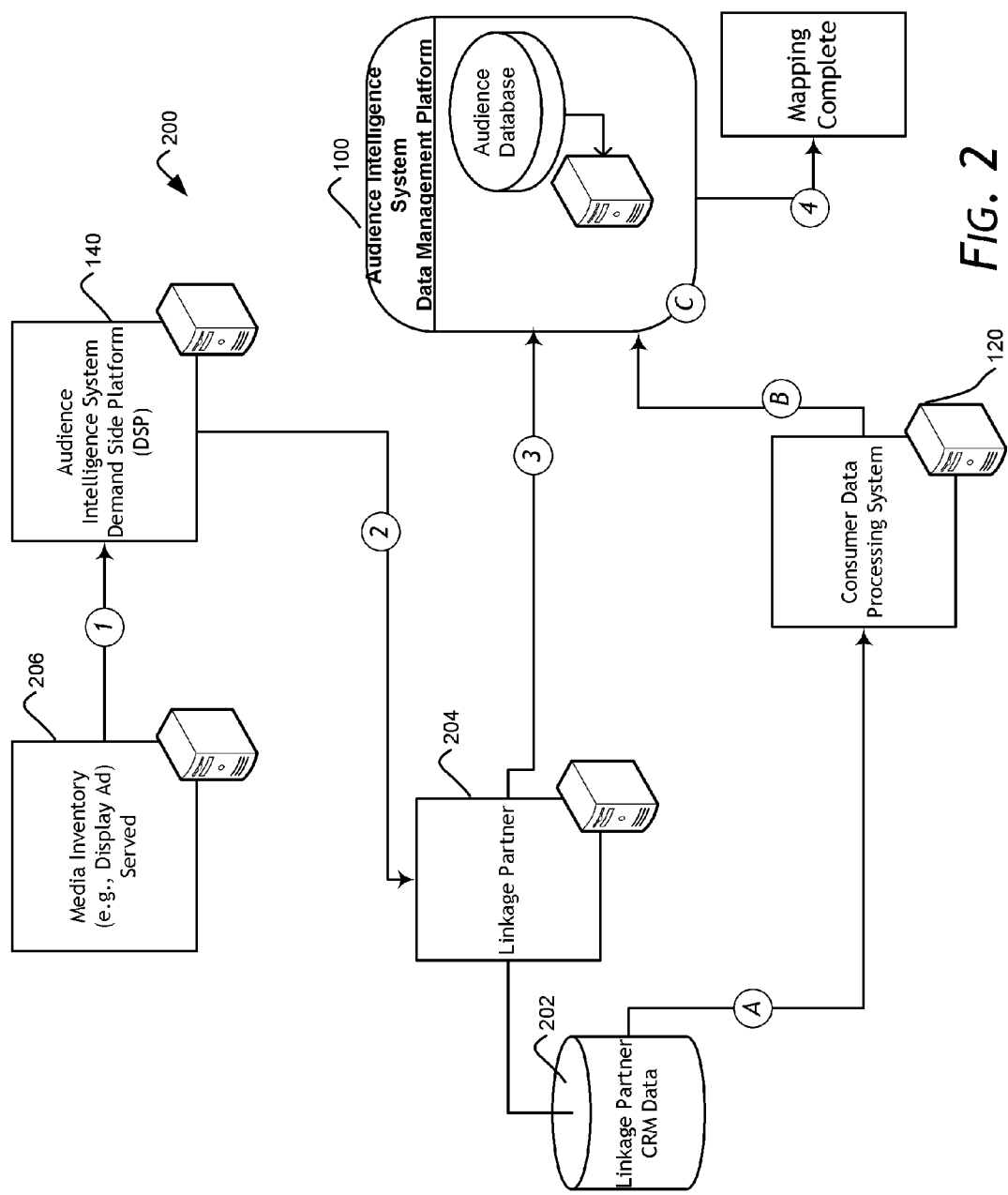
FIG. 2 is a flow diagram showing a process of integrating online and offline data within the audience intelligence system and the consumer data processing system according to one embodiment.

FIG. 2 is a flow diagram showing a process of integrating online and offline data sources within the audience intelligence system and the consumer data processing system 120. The process 200, in one embodiment, includes two processes that together enable the mapping of online to offline data. The first of the two processes in FIG. 2 is labeled using letters and the second is labeled using numerals.

The first process begins, in one embodiment, when a linkage partner's CRM data 202 is sent with partner IDs to the customer data processing system 120, as shown by the letter "A." The linkage partner could be a retailer, for example. Through this process, the retailer may wish to gain additional insight on its customers, and coordinate online marketing efforts to its customers. Once the data is received, the consumer data processing system 120 may create a mapping between the partner ID (e.g., an ID assigned to a customer by the partner entity) to an offline data ID (e.g., an ID assigned to the same customer by the entity performing the matching). This matching process will be further described below in conjunction with FIG. 3. The partner ID to offline data ID mapping is then sent to the audience intelligence system 100, as shown by the letter "B." The mapping is used in a real-time data flow to map offline data to online data (shown by the letter "C"), as will be further discussed below.

The second process begins, in one embodiment, when partner media content 206 triggers the start of the mapping process (shown by the number "1"). For example, the trigger could be a pixel request that is a part of a display ad, and the request is directed to a demand-side platform (DSP) 140 of the audience intelligence system. In one embodiment, as a result the trigger, a cookie from the consumer browser may be updated, or if a cookie is not present, a new one may be created. The request received at the DSP may then be sent to a system controller by the linkage partner 204 to redirect and may pass control to the partner (shown by the number "2"). In one embodiment, the linkage partner, now provided with access to the browser cookie data, then determines whether its cookie exists. If such a cookie exists, the partner may trigger a request to the audience intelligence system with the partner ID previously sent for offline data integration by the first process described above (shown by the number "3"). The cookie in one embodiment includes an audience intelligence system ID assigned to the consumer. Finally, with partner ID mapped to the offline data ID, and the association of the mapping to the audience intelligence system ID within the cookie, the mapping is completed (shown by the number "4"). The mapping links the audience intelligence system ID (the online to the offline ID and to the partner ID. In one embodiment, the cookie does not include the data used for targeting. Rather the cookie provides an identifier (e.g., audience intelligence system ID) associated with the mapping.

Mapping Example

Figure 3A:
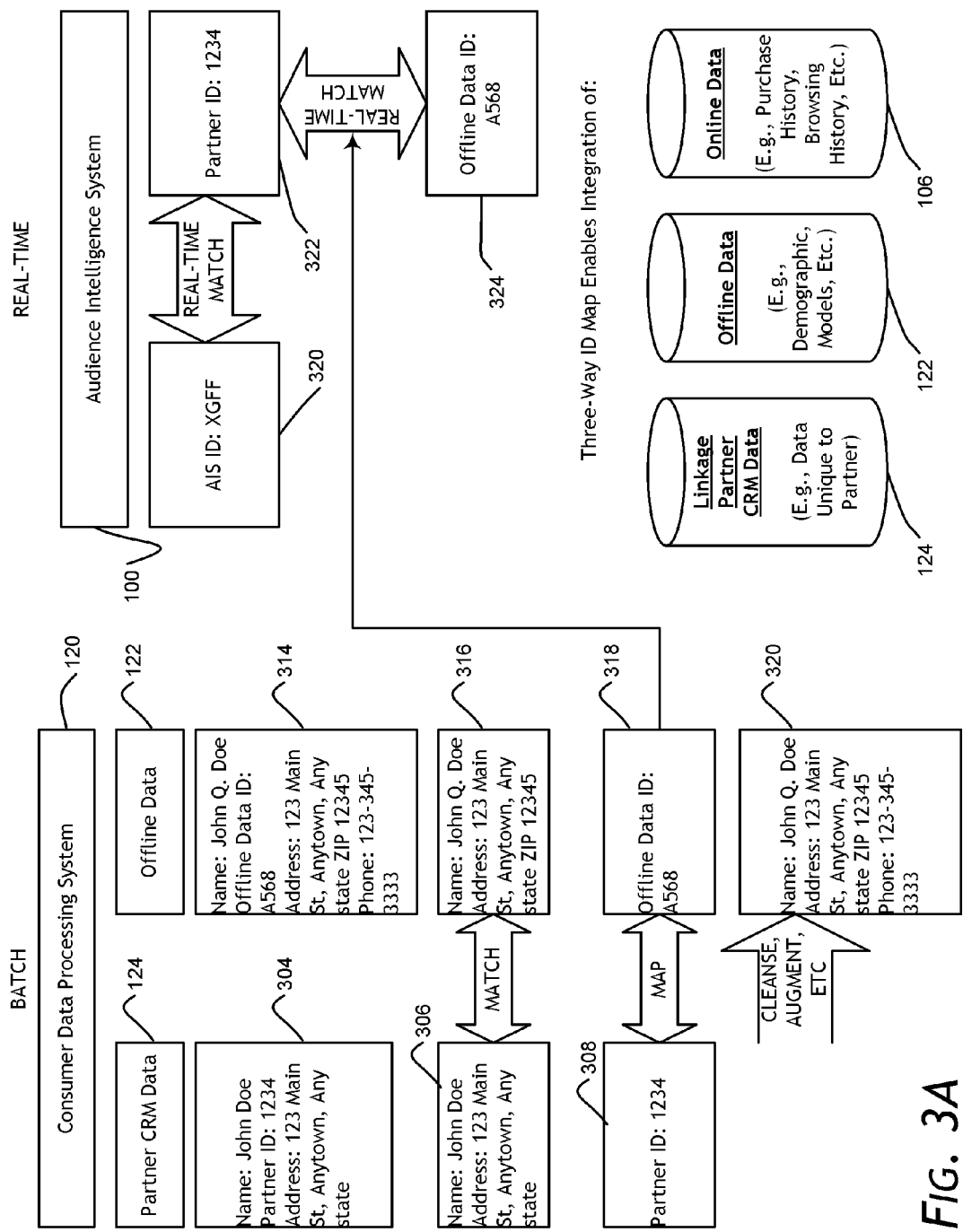
FIG. 3A is a flow diagram illustrating the processing of mapping offline and online data according to one embodiment.

FIG. 3A is a flow diagram illustrating the processing of mapping offline and online data according to one embodiment. FIG. 3A tracks an example data mapping from start to finish. The mapping in one embodiment is performed by the batch processing system 120. On the far left hand side of FIG. 3A is the partner CRM data 302. The partner CRM data 124 is to be matched with offline data 304 that is accessed by the batch processing system 120. As shown, the example partner CRM data includes an individual's name, a partner ID for that individual, and an address for that individual. These data fields are provided here for illustrative purposes only and additional and/or other data fields may be used in various embodiments for matching. Within the offline data 122, additional information associated with that individual may be present. In one embodiment, the batch processing system 120 is configured to match that individual's information as indicated by the partner CRM data to the individual's information as indicated by the offline data 122. As shown, the match is performed on the basis of the name and address information (306, 316). However, in various embodiments the matching may be based on other pieces of information. On the basis of that match, a mapping between the partner ID and the offline data ID is created (308, 318). After the mapping is created, optionally the data for the individual may be cleansed and/or augmented with additional data associated with the individual from one or more offline data sources (320). As shown in the example, the individual's name as indicated by the partner CRM data has been cleansed/augmented with a middle initial and the address has been cleansed/augmented with a ZIP code. A phone number has also been added to the record.

As an example, in one embodiment, the offline data 122 may include one or more of the following types of information: (1) custom business data and (2) geographic level demographics that include one or more models, such as models that identify lifestyle attributes associated with a geographic location (e.g., MOSAIC® segmentation from Experian) and/or attitudinal/psychographic attributes associated with a geographic location (e.g., TrueTouch$^{SM}$ Touch Points segmentation from Experian). In other embodiments, other attributes of an individual may be estimated based on a geographic region of the individual. Other types of offline data may include census data, and/or data items from a demographic database such as an Experian® INSOURCE$^{SM}$ database.

The partner ID to offline data ID mapping is used by the audience intelligence system in real time to perform a real-time match, as previously shown in FIG. 2. As shown here in FIG. 3A, the audience intelligence system ID 320 for John Doe ("XGFF") is matched real time with the partner ID 322 assigned to John Doe ("1234"). With the partner ID to offline data ID mapping having been previously created as discussed above, a three-way ID match is now complete. This three-way ID map enables the integration of one or more of: linkage partner CRM data 124, offline data 122, and online data 106. In one embodiment, the linkage partner CRM data can include data that is unique to the partner. For example, if the partner is a brick-and-mortar retailer, the data may include past purchase history and/or preferences of the individual as collected by the retailer. The offline data, for example, may include demographic data related to the demographic attributes of the neighborhood in which the individual resides. The online data, for example, may include purchase history and all browsing history of that individual that have been collected by various other sites. The linking of these three types of data sources enables the audience intelligence system to provide a dynamic and comprehensive set of data that can be used for improving targeted marketing for the partner in the various types of advertising channels such as those shown in FIG. 1. In this particular example where partner is a retailer, the retailer may be able to better tailor their interactions with their customers, online and offline, by merging their own customer data to various offline data and online data about their customers.

Figure 3B:
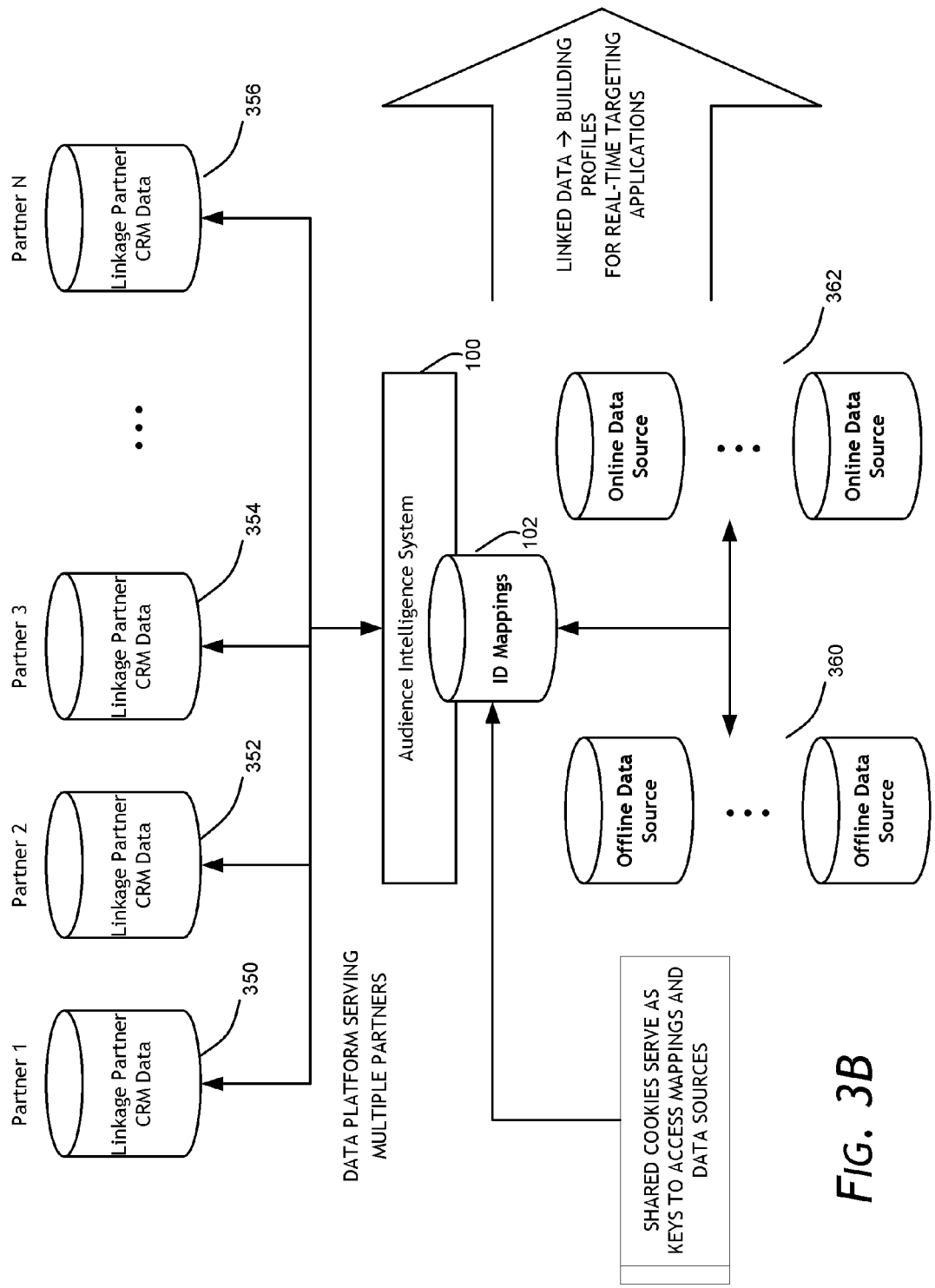
FIG. 3B is a block diagram that shows the audience intelligence system servicing several partners and leveraging the partners' CRM data according to one embodiment.

FIG. 3B is a block diagram that shows the audience intelligence system servicing several partners and leveraging the partners' CRM data according to one embodiment. As shown, the audience intelligence system 100 services multiple linkage partners 350, 352, 354, and 356. In one embodiment, these partners share a unified cookie platform/system architecture through which a cookie (with an audience intelligence system ID) is tied to an individual and is used for sharing data. The shared cookie for the individual provides, in one embodiment, access to various ID mappings as previously discussed above. With such mappings, the various data sources including offline data sources and online data sources could be tied to the individual. As such, the link data may be used to build profiles for real time targeting applications.

Batch Processing of Offline Data

Figure 4:
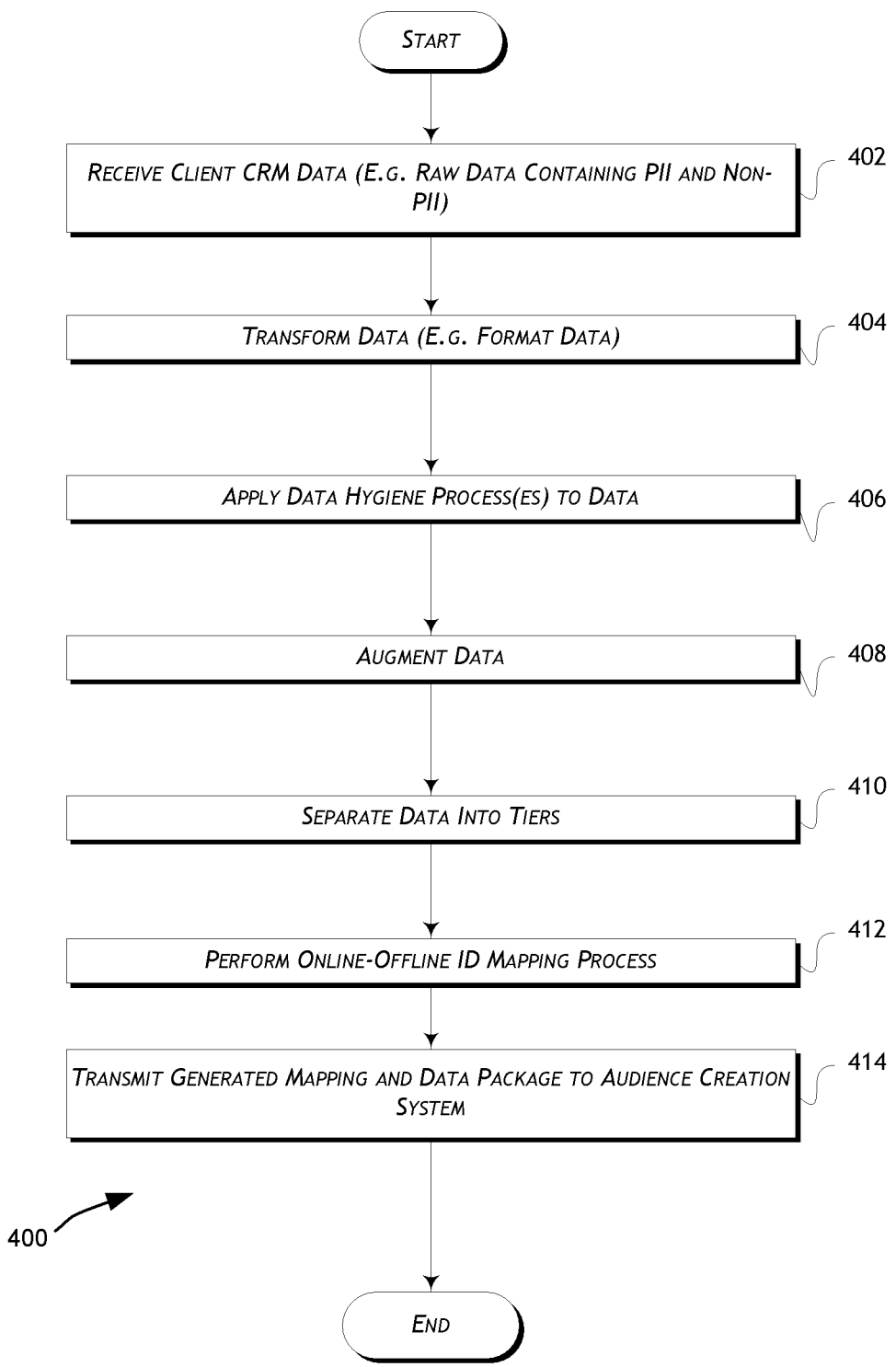
FIG. 4 is a flowchart that shows the batch processing of data in one embodiment.

FIG. 4 is a flow diagram that shows the batch processing of data in one embodiment. In block 401, the batch processing system receives client CRM data (e.g., raw data containing personal identifying information (PII) and non-PII). In block 402, the batch processing system transforms the data (e.g., by formatting it). The transformation may include converting the incoming data into standard formats while also auditing for data validity. This may include the ability to accept different data types such as ASCII, EDCDIC, Binary, and UTF-8, and fixed or variable blocked file inputs, and convert those into standard formats. Domestic and foreign addresses and conversion of foreign data elements into English data elements are also supported in one embodiment. Additionally transforming logic such as dropping or adding certain characters may be used, and custom logic provided by the client may be applied as well.

Then in block 403, the batch processing system applies data hygiene process(es) to the data. The data hygiene may include one or more of the following functions: (1) address standardization (CASS certified process), including LACS, Suite, and DSF, (2) apartment append, (3) advanced address correction (AAC), (4) advanced address correction maximum (AAC Max), (5) NCOA (National Change of Address), COA+ (Change of Address+) and DSF processing, (6) ability to keep or drop invalid records, (7) ability to keep or drop NCOA undeliverable, and (8) ability to apply latitude and longitude data based on the address.

In block 404, the batch processing system may augment the data, for example, by adding additional information associated to the individuals identified in the data. The data augmentation may include capturing the incoming (now transformed/cleansed) address information and appending additional information such as email, phone, IP address, etc. In one embodiment, the incoming data may be point of sale data from in store transactions or data from online sales transaction. In such cases, address and other contact information may be added to the sale data to complete the records. A match confidence level may be returned as a result of the matching/augmentation/hygiene steps.

In block 405, the batch processing system may optionally separate data into tiers, with each tier defining a level of granularity. For example, some offline data maybe mapped at the personal level, some maybe mapped at the household level, and some maybe mapped at the local area level (e.g., area defined by a ZIP code). For example, going back to the example in FIG. 3B, if John Doe cannot be matched to an individual record in the offline data, John Doe may be matched to a household record for the "Doe" household. If a household record does not exist, John Doe may be matched to a local area record such as an area defined by a ZIP code. Alternatively, the partner may specify the level of matching and a combination of matching (personal, household, local area) may be provided together. In block 406, the batch processing system performs online-offline ID mapping process, as previously discussed above in conjunction with FIGS. 2 and 3A. Then in block 407, the batch processing system transmits generated mapping and data packages to the audience intelligence system.

Shared Cookie Architecture

Figure 5:
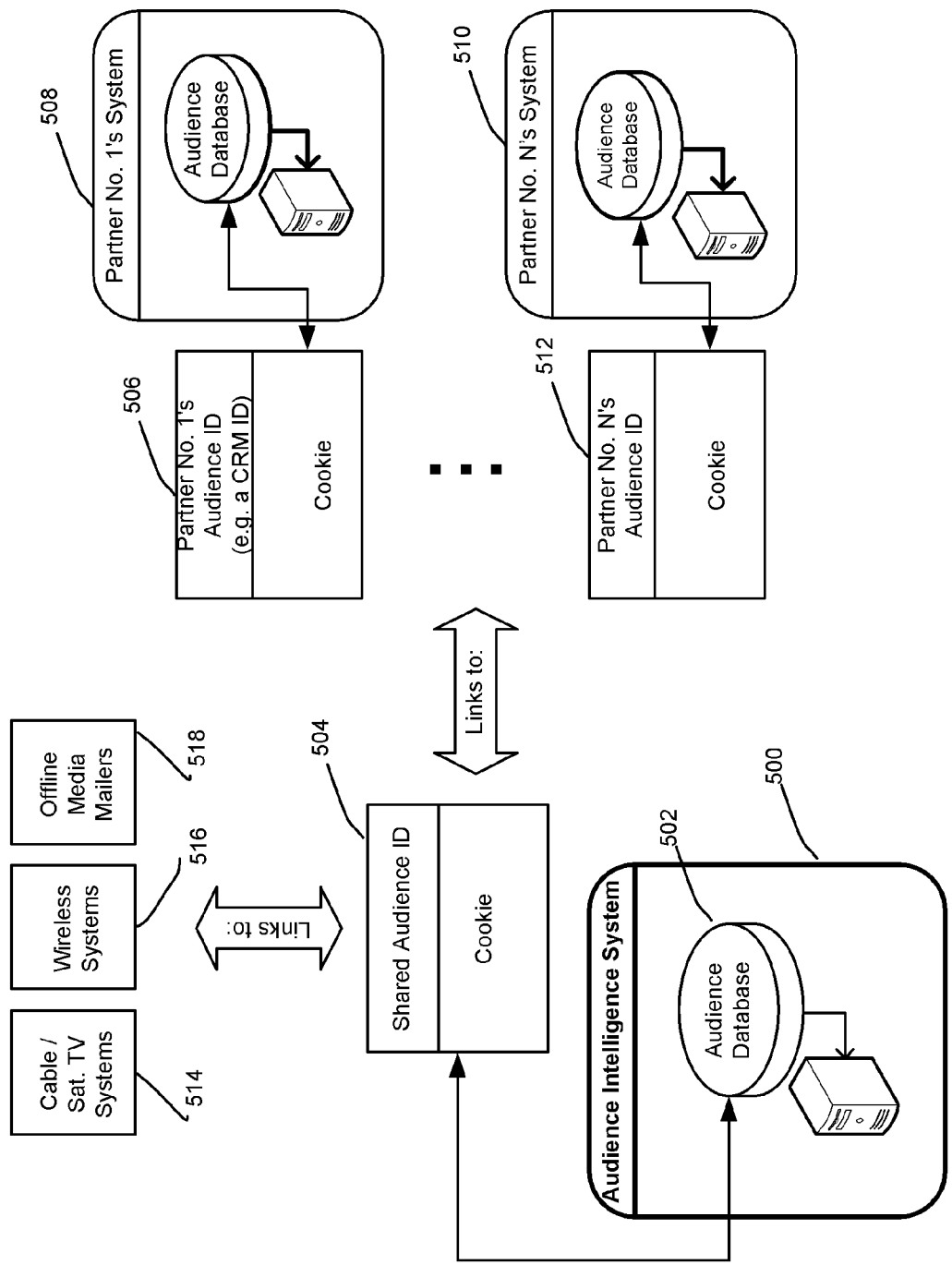
FIG. 5 is a block diagram illustrating an example audience intelligence system that is based on a shared cookie architecture according to one embodiment.

FIG. 5 is a block diagram illustrating an example audience intelligence system that is based on a shared cookie architecture according to one embodiment. In FIG. 5, this embodiment of the audience intelligence system 500 includes an audience database 502, whose data is accessible via a shared audience ID 504. The ID may be embedded in a browser cookie in one embodiment. In one embodiment, to protect the privacy of the person associated with the shared cookie, the shared cookie does not contain any personally identifiable information. In one embodiment, data attributes are stored in the cookie on an as needed basis, with the shared data being delivered from the audience database 502 in real time as further described below.

FIG. 5 also illustrates a number of partners with their associated systems 1 (508) to N (510), each of which may be a computing system controlled by an entity like a retailer store or an ad network or ad exchange that wishes to participate in the sharing of consumer data. Shared audience ID embedded in the shared cookie 504 provides access to the shared consumer data in the audience database 502, and the shared data may be used by the individual entities (partners) participating in the sharing to improve online marketing efforts (e.g., social media marketing, email marketing, online display advertising, etc.). The shared consumer data may also be used in tailoring interactions with consumers in cable and satellite TV systems 514, in wireless phone and data systems 516, and in offline media mailing campaigns 518.

In one embodiment, a partner links its own ID (506, 512) to the shared cookie ID (504) as follows. When a partner writes data to the shared cookie, it also writes an ID (separate from the audience ID) that can be tied back to the partner's own cookie or its CRM system 508. In another embodiment, the partner may perform this action so it can tie its own cookie with all other data assets on the shared cookie. This is useful in a situation where the partner has an extensive cookie data infrastructure already in place and where there are many data assets already accumulated in the partner's own cookie.

In one embodiment, the shared cookie is invoked in a page with embedded data content (e.g., scripting language such as JavaScript) that is used to trigger the cookie read. The data content includes a common or universal tag that is to be used if a site wants to implement the cookie read feature. In one embodiment the common tag each has a unique partner ID. This process is further described below in conjunction with FIG. 9.

In batch mode, a partner uses data that is returned in a batch mode operation as follows. A web server passes transactional information from online process to batch process. When the batch process is performed to get data not on the shared cookie, the batch process links back to cookie through a real time database lookup. In one embodiment, the writing of the data to the cookie maybe delayed until a subsequent request from partner. In another embodiment, the writing can take place in real-time.

The sharing of data can occur as follows according to one embodiment. For example, a first partner may want to monetize data with a second partner. However, the first partner may not want to share all of its consumer in the arrangement. With the shared cookie architecture, the first partner can selectively choose a part of its data to be shared on the shared cookie 504, such as a product category, and prevent from sharing other information it may have on its first party cookie (e.g., cookie 506, 516). This puts the product category data in the shared cookie so the first partner can share data with the second partner. The cookie would be set up with distribution rights.

Shared Cookie Example

FIG. 6 illustrates data attributes within the shared cookie architecture according to one embodiment. As shown, the data structure within the example shared cookie may include a number of key-value attribute pairs (602, 604). Each pair may be associated with data related to a read privilege 606 and/or a modify privilege (608). Here, the "Audience ID" attribute provides a unique ID that identifies the individual associated with the cookie. As discussed above, the unique ID may be associated with a partner/client ID which may be linked to a CRM data source.

The other attributes shown in FIG. 6 each have read and/or modify privilege data. For example, the "Last Visit to Site X" attribute could be read by partner (associated with a client/partner) 1, 2, and 3 but could be modified only by partner 1. Thus, partner 1, 2, and 3 could read this attribute value but only partner 1 could modify it. The sharing of other attributes in this example is illustrated by the other attributes. In this manner, the data values could be selectively shared across partners, and read/write access privileges are controlled/defined by the access privilege data.

In one embodiment, each data attribute is matched to an owner ID, and the data is specific to a machine/user (e.g., identified by the unique "Audience ID" in this example). The data thus need not be stored in the audience database. In one embodiment, the data is stored in the audience database, and certain data elements are inserted into the cookie when a partner requests them, in real time or substantially in real time. For example, in the audience database may be hundreds or thousands of data elements, and a partner may be provided with a subset of those data elements. If a partner is an automobile dealership, data elements relevant to automobile purchases may be inserted into the cookie in real time.

Shared Cookie—Data Processing Flows for Retrieving and Adding Data

Figure 7:
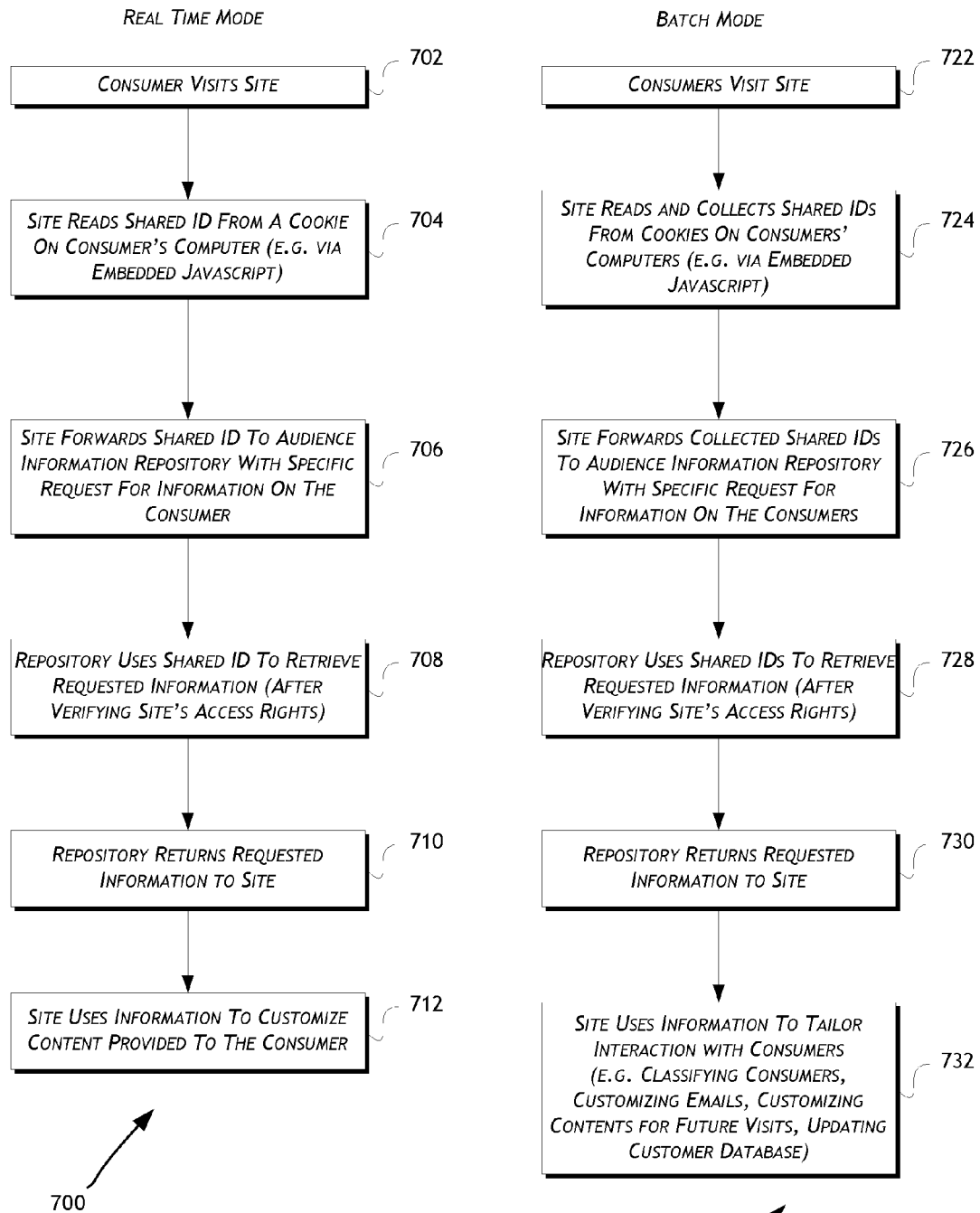
FIG. 7 provides two flowcharts illustrating example data processing methods, one in real time mode and one in batch mode, according to one embodiment.

FIG. 7 provides two flow diagrams illustrating example methods of accessing the consumer data related to the shared cookie architecture according to one embodiment. Process 700 describes an operation performed in real time or substantially real time, while process 720 describes an operation performed in batch mode.

The real time process 700 begins in block 702 when a consumer visits a website. The visit could be performed by the consumer instructing a browser in a computing device to access the website. Alternatively, the visit may be triggered indirectly when the user visits another site with data content that makes a data request to the site. Regardless, in block 704, the site reads the shared ID from a cookie on the consumer's computing device (e.g., via an embedded Javascript in the site's content). Then in block 706, the site forwards the shared ID to an audience information repository (e.g., the audience database within the audience intelligence system 500) with a specific request for information on the consumer. Then in block 708, the repository uses the shared ID to retrieve the requested information. This may be performed after verifying the site's access rights to the particular information requested (as previously shown in FIG. 6). In block 710, the repository returns the requested information to the site. Finally, in block 712, the site uses the returned information to customize content provided to the consumer.

Alternatively, in batch mode operation, the process 720 begins in block 722 when various consumers visit the website (directly or indirectly, as discussed above). In response to those visits, in block 724, the site reads and collects the shared IDs from cookies on those consumers' computing devices (e.g., via an embedded Javascript in the site's content). Then in block 726, the site forwards the collected shared IDs to the audience information repository (e.g., the audience database within the audience intelligence system) with a specific request for information on the consumers associated with the shared IDs. Then in block 728, the repository uses the shared IDs to retrieve the requested information. This may be performed after verifying the site's access rights to the particular information requested (as previously shown in FIG. 6). Then in block 730, the repository returns the requested information to the site. Then in block 732, the site uses information to tailor interaction with consumers (e.g., classifying consumers, customizing emails, customizing contents for future visits, updating its own customer database).

Figure 8:
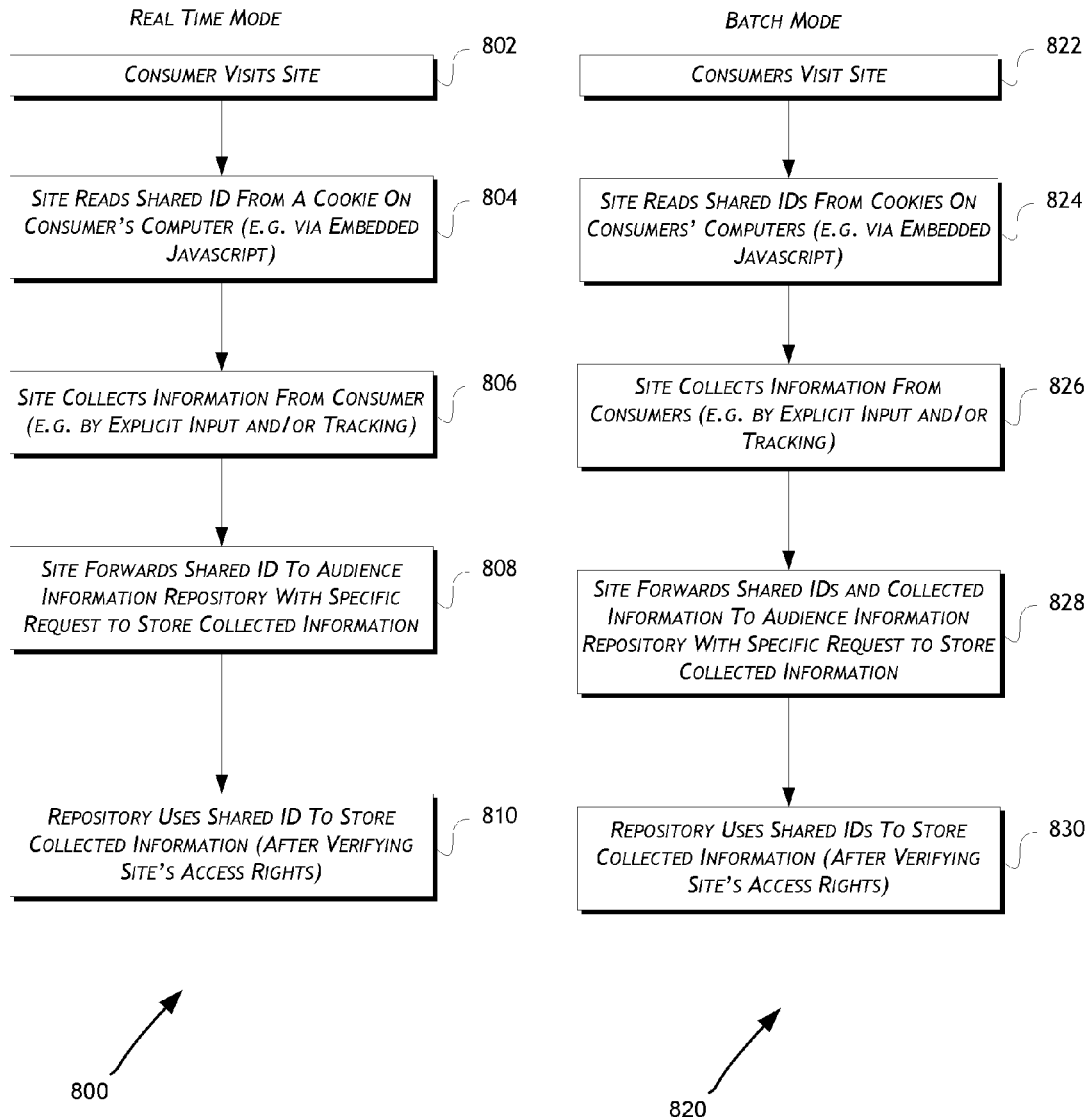
FIG. 8 provides two flowcharts illustrating example data processing methods, one in real time mode and one in batch mode, according to one embodiment.

FIG. 8 provides two flow diagrams illustrating example methods of updating the consumer data related to the shared cookie architecture according to one embodiment. Process 800 describes an operation performed in real time or substantially real time, while process 820 describes an operation performed in batch mode. The real time process 800 begins in block 802 when the consumer visits the website (directly or indirectly). Then in block 804, the website reads the shared ID from a cookie on the consumer's computing device (e.g., via an embedded Javascript). Then in block 806, the site collects information from the consumer. The information may be collected by explicit input (recording information provided by the consumer) and/or through tracking the consumer's interaction with the site. Then in block 808, the site forwards the shared ID to the audience information repository with specific request to store the collected information. Finally in block 810, the repository uses the provided shared ID to store the collected Information (after verifying the site's right to modify that portion of the data associated with the shared cookie).

The batch mode process 820 begins in block 822 when consumers visit the site (directly or indirectly). In response to those visits, in block 824, the site reads shared IDs from the cookies on the consumers' computing devices. Then in block 826, the site collects information from consumers (e.g., via explicit input and/or tracking). Then in block 828, the site forwards the shared IDs and collected information to the audience information repository with a specific request to store the collected information. Finally in block 830, the repository uses shared IDs to store collected information (after verifying the site's right to modify that portion of the data associated with the shared IDs).

Shared Cookie Architecture

Figure 9:
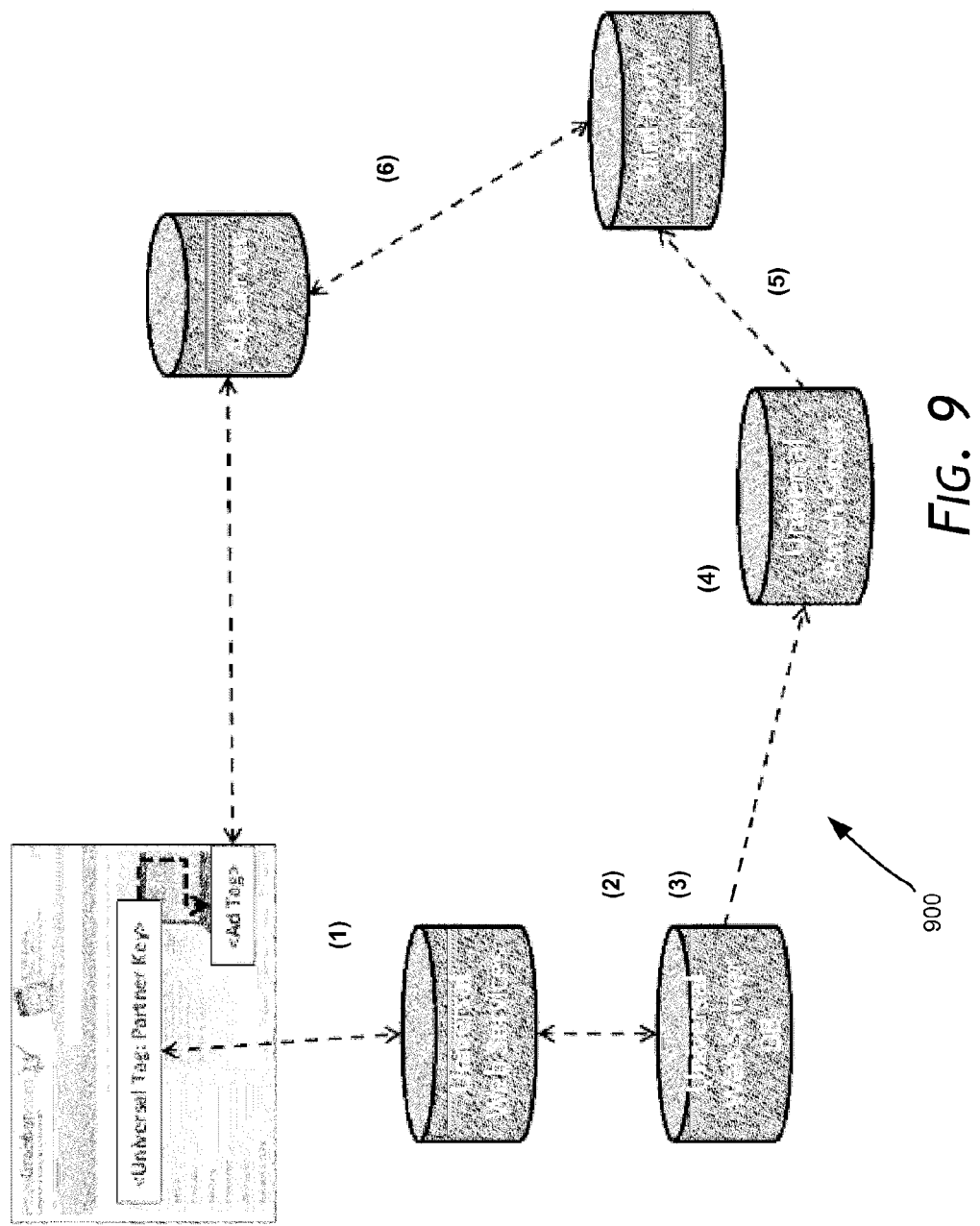
FIG. 9 is a combined block and flow diagram showing a method for targeting an advertisement using universal tags according to one embodiment.

FIG. 9 is a combined block and flow diagram showing a method 900 for targeting an advertisement using universal tags according to one embodiment. As illustrated in FIG. 9 and described below, a common cookie may be used by multiple entities ("partners"), e.g., web properties, in order to store and share data elements. Advantageously, the format of the common cookie includes a partner ID associated with each data element (or group of data elements) stored in the cookie so that access rights to the data elements may be allocated on a per-partner basis. For example, a first partner may have access to data elements in particular verticals markets that are provided by the common cookie service provider (and/or one or more third parties), while a second partner may have access to data elements in other verticals, including data stored in the common cookie by certain other partners. Additionally, partners' rights to store data on the common cookie may be customized. Thus, the systems and methods described herein provide partner specific rights to data elements.

In one embodiment, the common cookie server updates a common cookie in real-time to include the data elements that are needed by (and are authorized to be provided to) the requesting partner. Thus, the common cookie may be updated to include (and information that is not important to the requesting partner may be removed from the cookie) the relevant data elements so that the partner can provide targeted content to the user in a landing page, subsequent pages of the web property, and/or later visits to the web property.

Returning to FIG. 9, the process begins at (1) when a partner web page embedded with a universal tag with an encrypted partner key requests services from a universal web server (e.g., audience intelligence system 500 in FIG. 5), which houses universal web services. At (2), based on the partner key, the server determines what read and write services are allowed. At (3), the server writes the allowed content into the universal cookie. Then, at (4), the server executes a partner script and/or an ad tag for any allowed data appends from the partner which will be written to the universal cookie. Then at (5), web services transaction with the partner key may trigger batch service request for offline (batch) process, which is handled by the universal batch server (e.g., the consumer data processing system 120 in FIG. 1) in one embodiment. At (6) the ad server instructions are updated by the offline processes, such as modeling or more extensive data collection efforts.

In certain embodiments, the systems and methods may include one or more of the following components, features, and/or advantages:

- A common tag with a common cookie is utilized but the instructions are client specific, based on partner key used in the transactions.
- The common cookie can be used across third parties that have approved partner keys.
- The common cookie can contain data from multiple parties, all securely governed with access controls. Controls can be applied at the partner level or data level. A partner may have limited rights to a partner's data source versus having unlimited rights to that same data source.
- The common cookie can allow third party data appends, based on the rights associated with the partner key. The data appends can be limited, unlimited, structured or free form.
- Along with data from the common cookie service provider, data collected on the common cookie from third party partners can be shared with other partners, based on the rights associated with a partner key. For example, partner A can allow partner B access to all or some of partner A's data, via the common cookie.
- The data within the common cookie can be updated in real time, at the time of transaction, with the data needed to support the transaction. This allows the common cookie to be utilized for multiple content and advertising purposes, not limited by the data stored on the cookie or technical limitations of storing data on the cookie.
- The common cookie and pixel management process is integrated to work for almost any partner or client. The integrated set of functions with security enabled access controls minimizes the need to set up client specific deployments for cookie services. One deployment is use of a unique partner key that specifies the services that will be enabled on the cookie as well as for any server side and batch functions.

Computing Hardware Implementation

FIG. 10 is a block diagram illustrating an example computing system 1030 that may be adapted to implement the various components and/or systems described in the various embodiments. The computing system 1030 includes, for example, a personal computer that is IBM, Macintosh, or Linux/Unix compatible. In one embodiment, the computing system 1030 comprises a server, a desktop computer, a laptop computer, a personal digital assistant, a kiosk, or a mobile device, for example. In one embodiment, the computing system 1030 includes a central processing unit ("CPU") 1090, which may include one or more conventional microprocessors. The computing system 1030 may further include a memory 1072, such as random access memory ("RAM") for temporary storage of information and a read only memory ("ROM") for permanent storage of information, and a mass storage device 1082, such as a hard drive, diskette, or optical media storage device. Typically, the components and modules of the computing system 1030 are connected to the computer using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 1030 may be combined into fewer components and modules or further separated into additional components and modules.

The computing system 1030 is generally controlled and coordinated by operating system software, such as Windows Server, Linux Server, Windows XP, Windows Vista, Windows 7, Unix, Linux, SunOS, Solaris, or other compatible server or desktop operating systems. In Macintosh systems, the operating system may be any available operating system, such as MAC OS X. In other embodiments, the computing system 1030 may be controlled by a proprietary operating system. Conventional operating systems control and schedule computer processes for execution, perform memory management, provide file system, networking, I/O services, and provide a user interface, such as a graphical user interface ("GUI"), among other things.

The computing system 1030 includes one or more commonly available input/output (I/O) devices and interfaces 1068, such as a keyboard, mouse, touchpad, and printer. In one embodiment, the I/O devices and interfaces 1068 include one or more display device, such as a monitor, that allows the visual presentation of data to a user. More particularly, a display device provides for the presentation of GUIs, application software data, and multimedia presentations, for example. The computing system 1030 may also include one or more multimedia devices 1062, such as speakers, video cards, graphics accelerators, and microphones, for example. In other embodiments, such as when the computing system 1030 comprises a network server, for example, the computing system may not include any of the above-noted man-machine I/O devices.

In the embodiment of FIG. 10, the I/O devices and interfaces 1068 provide a communication interface to various external devices. In the embodiment of FIG. 10, the computing system 1030 is electronically coupled to the networks 1040 and 1060, both of which may comprise one or more of a LAN, WAN, or the Internet, for example, via a wired, wireless, or combination of wired and wireless, communication links 1063 and 1065. The networks 1040 and 1060 facilitate communications among various computing devices and/or other electronic devices via wired or wireless communication links.

In one embodiment, requests and responses for data and/or data operations are sent to the computing system 1030 over the network 1040 and/or 1060. Similarly, results are returned over the network 1040 and/or 1060. In addition to the devices that are illustrated in FIG. 10, the computing system 1030 may communicate with other data sources or other computing devices. In addition, the data sources may include one or more internal and/or external data sources. In some embodiments, one or more of the databases, data repositories, or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 10, the computing system 1030 also includes modules that may be executed by the CPU 1090 to perform data operations. For example, in the consumer data processing system, the data operations may include the operations depicted in FIGS. 1-4. The modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Alternately, one or both of them may be implemented as separate devices, such as computer servers.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

All of the processes described above may be embodied in, and fully automated via, software code modules executed by one or more general purpose computers. The code modules may be stored in any type of computer-readable medium or other computer storage device. Some of all of the methods may alternatively be embodied in specialized computer hardware. In addition, the components referred to herein may be implemented in hardware, software, firmware, or a combination thereof.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

CONCLUSION

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of enabling of sharing of consumer data across entities, comprising:
   receiving, by a computing system having one or more computer processors, a request for consumer data from a requesting partner entity, the request triggered by reading of a cookie in an application executed on a computing device in communication with the requesting partner entity, wherein the requesting partner entity comprises a retailer requesting information regarding an individual using the computing device and/or the computing device, and wherein the cookie includes:
      a unique identifier associated with the individual and/or the computing device, the unique identifier associated with a consumer data element associated with the individual and/or the computing device;
   in response to the request from the requesting partner entity,
   accessing, by the computing system, from a repository of consumer information, a consumer data structure comprising a plurality of unique consumer identifiers and associations between unique consumer identifiers and corresponding data elements associated with respective individuals and/or the computing devices,
   identifying the unique identifier received from the requesting partner entity in the consumer data structure;
   identifying consumer data elements associated with the unique identifier in the consumer data structure, the consumer data elements including at least:
      a first consumer data element provided by a first partner entity that has determined the first consumer data element indicating one or more attributes associated with the individual in response to interactions of the first partner entity with the individual, and
      a second consumer data element provided by a second partner entity that has determined the second consumer data element indicating one or more attributes associated with the individual in response to interactions of the second partner entity with the individual,
      wherein the first consumer data element is not known to the second partner entity;
   accessing access restriction information associated with respective consumer data elements, the access restriction information indicating at least:
      a first one or more authorized partner entities which are allowed access to the first consumer data element associated with the unique identifier received from the requesting partner entity, wherein the first one or more authorized partner entities are provided by the first partner entity that provided the first consumer data element; and
      a second one or more authorized partner entities which are allowed access to the second consumer data element associated with the unique identifier received from the requesting partner entity, wherein the second one or more authorized partner entities are provided by the second partner entity that provided the second consumer data element;

determining one or more of the consumer data elements associated with the unique identifier that are associated with access restriction information indicating that the requesting partner entity is authorized to access the respective consumer data element;

generating a consumer data package for electronic communication to the requesting partner entity, the consumer data package including the one or more determined consumer data elements that the requesting partner entity is determined to be authorized to access; and transmitting the consumer data package to the requesting partner entity in substantially real-time from receipt of the request such that the requesting partner entity can use the consumer data package to customize interaction with the individual.

2. The method of claim 1, wherein returning the consumer data elements comprises:
updating the cookie with the requested consumer data elements.

3. The method of claim 1, wherein the request comprises a key identifying the requesting partner entity making the request.

4. The method of claim 1, wherein the consumer data elements being sought for were inserted into the repository in response to a request by the respective partner entity that has specified access restriction information associated with the consumer data elements to allow sharing of the consumer data elements with the requesting partner entity.

5. The method of claim 1, further comprising:
receiving an additional request from the requesting partner entity to modify one of the consumer data elements;
verifying the requesting partner entity's access right to modify the consumer data elements; and
when the requesting partner entity's access right to modify has been verified, receiving data from the requesting partner entity to modify the consumer data elements.

6. A system for enabling sharing of consumer data across entities, comprising:
a system comprising one or more computing devices, the system configured to:
receive, from a requesting partner entity, a request for consumer data, the request triggered by reading of a cookie in an application executed on a computing device in communication with the requesting partner entity, wherein the requesting partner entity comprises a retailer requesting information regarding an individual using the computing device and/or the computing device, wherein the cookie includes:
a unique identifier associated with the individual, the unique identifier associated with consumer data elements associated with the individual and/or the computing device
in response to the request from the requesting partner entity,
accessing, by the computing system, from a repository of consumer information, a consumer data structure comprising a plurality of unique consumer identifiers and associations between unique consumer identifiers and corresponding data elements associated with respective individuals and/or the computing devices;

identifying the unique identifier received from the requesting partner entity in the consumer data structure; and identifying consumer data elements associated with the unique identifier in the consumer data structure, the consumer data elements including at least:
a first consumer data element provided by a first partner entity that has determined the first consumer data element indicating one or more attributes associated with the individual in response to interactions of the first partner entity with the individual, and
a second consumer data element provided by a second partner entity that has determined the second consumer data element indicating one or more attributes associated with the individual in response to interactions of the second partner entity with the individual,
wherein the first consumer data element is not known to the second partner entity;

accessing access restriction information associated with respective consumer data elements, the access restriction information indicating at least:
a first one or more authorized partner entities which are allowed access to the first consumer data element associated with the unique identifier received from the requesting partner entity, wherein the first one or more authorized partner entities are provided by the first partner entity that provided the first consumer data element; and
a second one or more authorized partner entities which are allowed access to the second consumer data element associated with the unique identifier received from the requesting partner entity, wherein the second one or more authorized partner entities are provided by the second partner entity that provided the second consumer data element;

determining one or more of the consumer data elements associated with the unique identifier that are associated with access restriction information indicating that the requesting partner entity is authorized to access the respective consumer data element;

generating a consumer data package for electronic communication to the requesting partner entity, the consumer data package including the one or more determined consumer data elements that the requesting partner entity is determined to be authorized to access; and transmitting the consumer data package to the requesting partner entity in substantially real-time from receipt of the request such that the requesting partner entity can use the consumer data package to customize interaction with the individual.

7. The system of claim 6, wherein the system is further configured to return the consumer data elements by updating the cookie with the requested consumer data elements.

8. The system of claim 6, wherein the request comprises a key identifying the requesting partner entity.

9. The system of claim 6, wherein the consumer data elements being sought for were inserted into the repository in response to a request by the separate respective partner entity that has specified access restriction information associated with the consumer data elements to allow sharing of the consumer data elements with the requesting partner entity.

10. The system of claim 6, wherein the system is further configured to:

receive an additional request from the requesting partner entity to modify one of the elements;

verify the requesting partner entity's access right to modify the elements; and when the requesting partner entity's access right to modify has been verified, receive data from the requesting partner entity to modify the consumer data elements.

11. Non-transitory computer storage which stores executable program instructions that direct a computing system comprising one or more computing devices to perform a process that comprises:

receiving, from a requesting partner entity, a request for data associated with an individual, wherein the request includes a unique shared identifier associated with the individual and/or a computing device in communication with the requesting partner entity, wherein the requesting partner entity comprises a retailer requesting information regarding the individual using the computing device and/or the computing device;

accessing, using the unique shared identifier included in the request, from a repository of consumer information, a consumer data structure comprising a plurality of unique consumer identifiers and associations between unique consumer identifiers and corresponding data elements associated with respective individuals and/or the computing devices;

identifying the unique identifier received from the requesting partner entity in the consumer data structure;

identifying consumer data elements associated with the unique identifier in the consumer data structure, the consumer data elements including at least:

a first consumer data element provided by a first partner entity that has determined the first consumer data element indicating one or more attributes associated with the individual in response to interactions of the first partner entity with the individual, and a second consumer data element provided by a second partner entity that has determined the second consumer data element indicating one or more attributes associated with the individual in response to interactions of the second partner entity with the individual, wherein the first consumer data element is not known to the second partner entity;

accessing access restriction information associated with respective consumer data elements, the access restriction information indicating at least:

a first one or more authorized partner entities which are allowed access to the first consumer data element associated with the unique identifier received from the requesting partner entity, wherein the first one or more authorized partner entities are provided by the first partner entity that provided the first consumer data element;

a second one or more authorized partner entities which are allowed access to the second consumer data element associated with the unique identifier received from the requesting partner entity, wherein the second one or more authorized partner entities are provided by the second partner entity that provided the second consumer data element;

determining one or more of the consumer data elements associated with the unique identifier that are associated with access restriction information indicating that the requesting partner entity is authorized to access the respective consumer data element;

generating a consumer data package for electronic communication to the requesting partner entity, the consumer data package including the one or more determined consumer data elements that the requesting partner entity is determined to be authorized to access; and transmitting the consumer data package to the requesting partner entity in substantially real-time from receipt of the request such that the requesting partner entity can use the consumer data package to customize interaction with the individual.

12. The non-transitory computer-readable storage of claim 11 wherein the unique shared identifier is associated with a cookie on the computing device associated with the individual.

13. The non-transitory computer-readable storage of claim 11 wherein the request is triggered by reading of a cookie in an application executed on the computing device associated with the individual.

* * * * *